United States Patent
Nill

(10) Patent No.: US 11,927,016 B2
(45) Date of Patent: Mar. 12, 2024

(54) COMBINED ANCHOR AND FASTENER ASSEMBLY ESPECIALLY INTENDED FOR CONCRETE STRUCTURES AND METHOD EMPLOYING SAME

(71) Applicant: Lance Nill, Southampton, NY (US)

(72) Inventor: Lance Nill, Southampton, NY (US)

(73) Assignee: LN1 Inc., Southampton, NY (US)

( * ) Notice: Subject to any disclaimer, the term of this patent is extended or adjusted under 35 U.S.C. 154(b) by 0 days.

(21) Appl. No.: 17/272,558

(22) PCT Filed: Sep. 4, 2019

(86) PCT No.: PCT/US2019/049549
§ 371 (c)(1),
(2) Date: Mar. 1, 2021

(87) PCT Pub. No.: WO2020/051218
PCT Pub. Date: Mar. 12, 2020

(65) Prior Publication Data
US 2021/0324633 A1 Oct. 21, 2021

Related U.S. Application Data

(63) Continuation-in-part of application No. PCT/US2019/026058, filed on Apr. 5, 2019, which is
(Continued)

(51) Int. Cl.
*E04D 13/00* (2006.01)
*E04F 11/18* (2006.01)
*F16B 9/02* (2006.01)

(52) U.S. Cl.
CPC ................ *E04D 13/00* (2013.01); *F16B 9/02* (2013.01); *E04F 11/1812* (2013.01); *E04F 11/1853* (2013.01)

(58) Field of Classification Search
CPC .... E04B 1/4157; E04B 1/4164; E04B 1/4114; E04B 1/4121; E04B 1/4142; E04B 1/415; E02D 50/80; F16B 9/02; E04D 13/00
See application file for complete search history.

(56) References Cited

U.S. PATENT DOCUMENTS 2,377,397 A 6/1945 Booth
2,595,506 A 5/1952 Backman
(Continued)

FOREIGN PATENT DOCUMENTS

CN 107700671 A 2/2018
DE 3021360 A1 12/1981
(Continued)

OTHER PUBLICATIONS

European Patent Office Communication dated May 19, 2022.
(Continued)

*Primary Examiner* — Theodore V Adamos
(74) *Attorney, Agent, or Firm* — Galgano IP Law PLLC; Thomas M. Galgano; Edwin D. Schindler

(57) ABSTRACT

A combined anchor and fastener that includes an anchor baseplate having a top surface and a bottom surface and at least one throughbore extending from the top surface to the bottom surface thereof. An elongated post is coupled to the anchor baseplate having a first end and a second end and an at least partially threaded, internal cylindrical bore for receipt therein of a mechanical fastener. The bore extends from the first end of the post towards the second end thereof with said post internal bore being in alignment and registry with the anchor baseplate throughbore. The post has a second end portion depending from said bottom surface of said anchor baseplate. The bottom surface of the anchor baseplate is configured to allow at least a portion of the concrete structure to abut and lie generally flush thereagainst except for the area of said bottom surface thereof which is
(Continued)

covered by the post. An anchor is provided for anchoring the anchor baseplate to a concrete structure. A method of anchoring and fastening an object to a concrete structure is also disclosed.

21 Claims, 24 Drawing Sheets

Related U.S. Application Data a continuation-in-part of application No. PCT/US2019/018592, filed on Feb. 19, 2019, which is a continuation-in-part of application No. PCT/US2018/065465, filed on Dec. 13, 2018, which is a continuation of application No. 15/852,733, filed on Dec. 22, 2017, now Pat. No. 10,501,939.

(60) Provisional application No. 62/726,659, filed on Sep. 4, 2018, provisional application No. 62/724,891, filed on Aug. 30, 2018, provisional application No. 62/653,694, filed on Apr. 6, 2018, provisional application No. 62/632,453, filed on Feb. 20, 2018.

(56) References Cited

U.S. PATENT DOCUMENTS

| | | | |
|---|---|---|---|
| 2,775,017 A | 2/1953 | McDonough | |
| 3,245,181 A | 4/1966 | Stephenson | |
| 3,456,412 A | 7/1969 | Decombas | |
| 3,715,850 A | 2/1973 | Chambers | |
| 3,749,424 A | 7/1973 | Greene | |
| 3,868,732 A * | 3/1975 | Engelhart | F16B 45/00 403/197 |
| 4,306,397 A * | 12/1981 | Ramseyer | G21C 19/07 52/698 |
| 4,371,139 A | 2/1983 | Clark | |
| 4,490,083 A | 12/1984 | Rebish | |
| 4,658,946 A | 4/1987 | Adrian et al. | |
| 4,750,306 A * | 6/1988 | Granieri | E04B 1/4121 52/251 |
| 4,815,863 A | 3/1989 | Forster | |
| 4,872,298 A * | 10/1989 | Klemic, Jr. | E04B 1/4157 52/707 |
| 4,932,818 A * | 6/1990 | Garwood | E04B 1/4157 411/397 |
| 5,085,547 A | 2/1992 | Vanotti | |
| 5,309,688 A | 5/1994 | Robertson | |
| 5,596,845 A | 1/1997 | Strizki | |
| 5,603,187 A | 2/1997 | Merrin et al. | |
| 5,653,078 A | 8/1997 | Kies et al. | |
| 6,015,138 A | 1/2000 | Kohlberger | |
| 6,141,928 A | 11/2000 | Platt | |
| 6,290,212 B1 | 9/2001 | Bartel | |
| 6,295,773 B1 | 10/2001 | Alty | |
| 6,361,258 B1 | 3/2002 | Heesch | |
| 6,439,817 B1 | 8/2002 | Reed | |
| 6,557,912 B1 | 5/2003 | Truong | |
| 6,568,145 B2 | 5/2003 | Bartel | |
| 7,475,479 B1 | 1/2009 | Ross | |
| 8,448,405 B2 | 5/2013 | Schaefer et al. | |
| 8,752,338 B2 | 6/2014 | Schaefer et al. | |
| 8,833,033 B2 | 9/2014 | Schaefer et al. | |
| 9,097,017 B1 | 8/2015 | Vanlennep | |
| 9,347,232 B1 | 5/2016 | Francies, III | |
| 9,464,397 B1 | 10/2016 | Abraham | |
| 2001/0009087 A1 | 7/2001 | Valentz et al. | |
| 2003/0221385 A1 | 12/2003 | Platt | |
| 2005/0053449 A1 | 3/2005 | Grubert et al. | |
| 2005/0120665 A1 * | 6/2005 | Anderson | E04B 1/2604 52/698 |
| 2005/0252124 A1 | 11/2005 | Bergman | |
| 2008/0240883 A1 | 10/2008 | Walling | |
| 2009/0272053 A1 * | 11/2009 | Dent | E04H 12/2261 52/699 |
| 2009/0288356 A1 * | 11/2009 | Fitzpatrick | F16B 37/145 411/339 |
| 2009/0293417 A1 | 12/2009 | Ren et al. | |
| 2010/0247270 A1 | 9/2010 | Cao | |
| 2011/0158766 A1 | 6/2011 | Mitrovic | |
| 2012/0090263 A1 | 4/2012 | Schaefer et al. | |
| 2012/0222380 A1 | 9/2012 | Wentworth et al. | |
| 2013/0000243 A1 | 1/2013 | Steffen | |
| 2013/0067831 A1 * | 3/2013 | Zimmerman | E04G 21/185 52/707 |
| 2013/0145704 A1 | 6/2013 | Stein, Jr. | |
| 2013/0272816 A1 | 10/2013 | Vilas | |
| 2013/0291479 A1 | 11/2013 | Schaefer et al. | |
| 2014/0101913 A1 | 4/2014 | Roddenberry | |
| 2014/0138596 A1 | 5/2014 | Ross | |
| 2015/0096242 A1 | 4/2015 | Lin | |
| 2015/0121797 A1 | 5/2015 | Brown et al. | |
| 2016/0017594 A1 * | 1/2016 | Drummond | E04B 1/41 52/699 |
| 2017/0175384 A1 | 6/2017 | Bergman | |
| 2017/0298617 A1 | 10/2017 | Espinosa | |
| 2018/0073241 A1 | 3/2018 | Lomax | |
| 2018/0209139 A1 * | 7/2018 | Tu | B21K 1/46 |
| 2018/0371743 A1 * | 12/2018 | Drummond | F16B 43/00 |

FOREIGN PATENT DOCUMENTS

| | | |
|---|---|---|
| DE | 3107506 A1 | 6/1982 |
| DE | 4041765 A | 6/1992 |
| DE | 4041765 A1 | 6/1992 |
| DE | 102008012717 A1 | 9/2009 |
| DE | 102011116877 A1 | 4/2013 |
| EP | 0001095 A2 | 3/1979 |
| EP | 0926362 A1 | 6/1999 |
| EP | 3034893 A1 | 6/2016 |
| JP | 52-80507 A | 6/1977 |
| JP | 9-158334 A | 6/1997 |
| JP | 2017155553 A | 9/2017 |
| RU | 2360123 C1 | 6/2009 |
| RU | 97936 U1 | 9/2010 |
| WO | 2008092664 A2 | 8/2008 |

OTHER PUBLICATIONS

International Search Report and Written Opinion for PCT/US18/65465 filed Dec. 13, 2018.
International Search Report and Written Opinion for PCT/US19/18592 filed Feb. 19, 2019.
International Search Report and Written Opinion for PCT/US19/43264 filed Jul. 24, 2019.
International Search Report and Written Opinion for PCT/US19/046201 filed Aug. 12, 2019.
International Search Report and Written Opinion for PCT/US19/49549 filed Sep. 4, 2019.
International Search Report and Written Opinion for PCT/US20/18327 filed Feb. 14, 2020.
Japanese Patent Office, Search Report for Japan Patent Application No. 2021-511639, dated Sep. 4, 2023, for Corresponding Japan Patent Application.
Eurasian Patent Office, Search Report for Eurasian Patent Application No. 202391874, dated Nov. 15, 2023, for Corresponding Eurasian Patent Application.

* cited by examiner

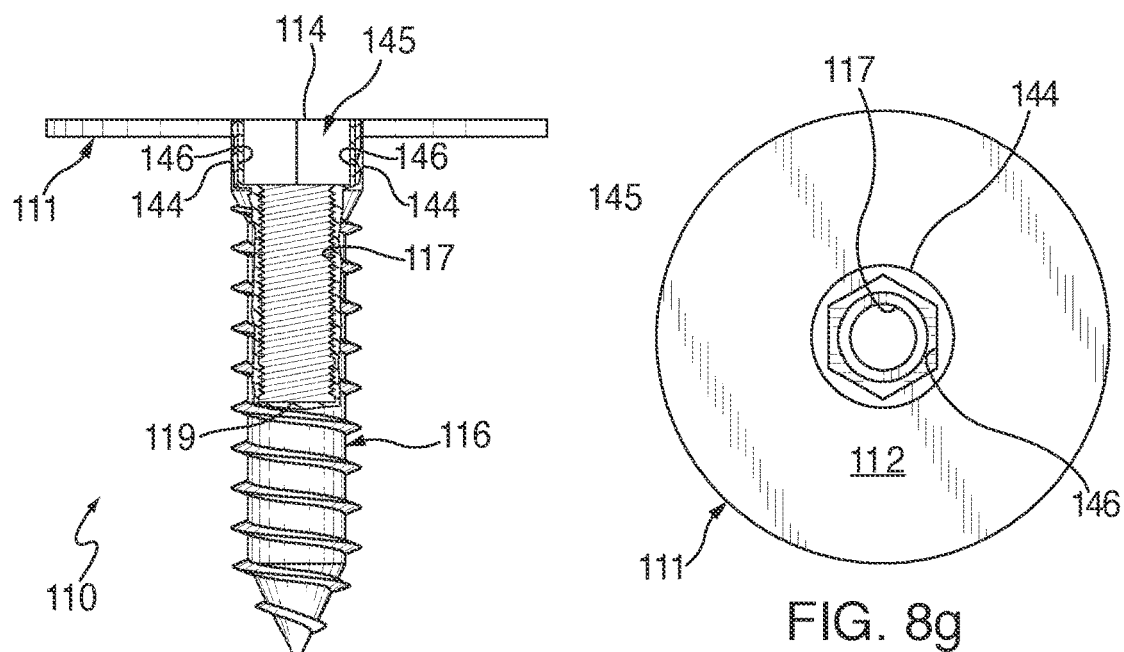
FIG. 8f
FIG. 8g
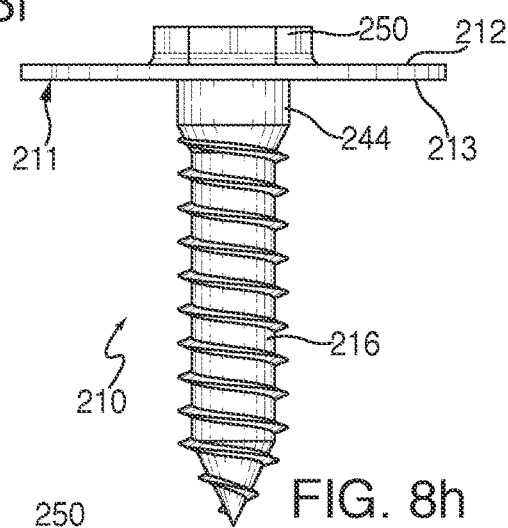
FIG. 8h
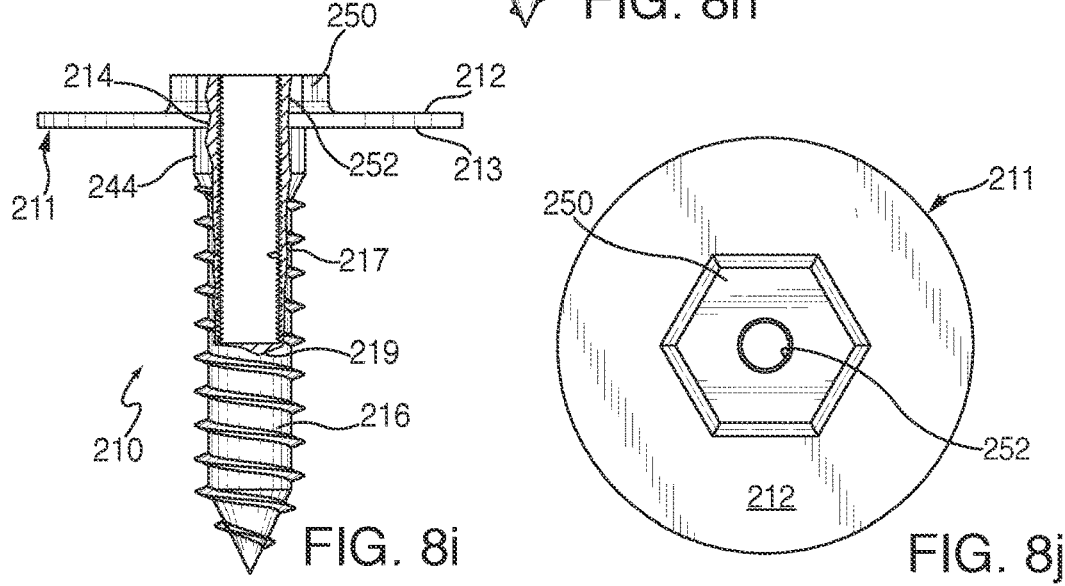
FIG. 8i
FIG. 8j

COMBINED ANCHOR AND FASTENER ASSEMBLY ESPECIALLY INTENDED FOR CONCRETE STRUCTURES AND METHOD EMPLOYING SAME

RELATED APPLICATIONS

This application claims the benefit of U.S. Provisional Patent Application Ser. No. 62/632,453, filed Feb. 20, 2018, U.S. Provisional Patent Application Ser. No. 62/653,694, filed Apr. 6, 2018; U.S. Provisional Patent Application Ser. No. 62/724,891, filed Aug. 30, 2018, and U.S. Provisional Patent Application Ser. No. 62/726,659 filed Sep. 4, 2018 and is a Continuation-In-Part of U.S. PCT Application No.: PCT/US2019/026058 filed Apr. 5, 2019 which, in turn, is a Continuation-In-Part of U.S. PCT/US2019/018592 filed Feb. 19, 2019 which in turn, is a Continuation-in-Part of U.S. PCT Application No. PCT/US/2018/065465, filed Dec. 13, 2018 which, in turn, is a Continuation of Non-Provisional patent application Ser. No. 15/852,733, filed Dec. 22, 2017, each of which is incorporated herein by reference thereto.

BACKGROUND OF THE INVENTION

1. Field of the Invention

The present invention relates generally to the field of fasteners and anchors and is particularly useful for the building industry. It especially relates to a combined anchor and fastener assembly, and a method employing same, for anchoring accessory structures or items, to concrete and masonry support structures, such as, sill plates fastened to concrete foundations, to afford a strong joint, provide facile and quick installation and watertight performance.

2. Brief Description of the Prior Art

Various methods for mounting accessory items or structures or the like, such as sill plates to, e.g., concrete foundations walls, partitions, roofs, etc., are well known. In the building industry, there are many problems with water infiltration at equipment or building attachment points, particularly when flashing is not incorporated and/or sealants are solely relied on. A variety of sheathing methods and combinations thereof are used as water and moisture barriers for such accessory items, such as sill plates which are mounted and fastened to a poured cement or masonry foundation or wall typically after they are fully set, such as solar panels, satellite dishes, and HVAC equipment. Today, glass walls and/or railings are very popular especially for roof decks, balconies, terraces and the like, to avoid viewing obstructions such as would normally be the case with a wooden, cable or metal fence. These generally heavy structures must also be anchored to the roof structures, but because of the loads they generate and the manner in which they are mounted, typically with anchors bolted through the roof, they create a "conduit" for water to penetrate through the roof, notwithstanding the fact that the adhesive and glue are often used to seal the conduit in an attempt to prevent such water penetration. In fact, over time, these heavy structures as a result of normal repetitive roof movement or shifting caused by, e.g., settling, temperature changes, and/or high winds, cause cracks in the adhesive or glues employed and cause eventual roof leaks. As a result, it is difficult for many of the installers to provide guarantees or obtain insurance against water or moisture damage caused by such conventional anchoring systems.

In Applicant's U.S. application Ser. No. 15/852,733, Applicant addressed this problem by the provision of a novel anchor and fastening assembly especially intended for mounting and waterproofing roof equipment, accessory structures or the like, such as solar panels, HVAC equipment and roof railings etc. on roofs, roof decks, balconies and the like, comprising an anchor baseplate, a post depending therefrom, the latter of which is receivable into or through the intended "anchoring" structure support and at least an partially threaded blind bore which passes through the baseplate and into the post. A fastener, such as a bolt, is receivable in the blind bore for fastening an object to the assembly. As mentioned above, the assembly can be used to secure, e.g., a solar panel, HVAC or other roof equipment to a roof or other building structure. The present invention provides an improvement to this novel anchor and fastener assembly, especially intended for both cured and uncured concrete structures by configuring the post as a one-piece screw or bolt anchor while still affording a strong and robust joint and watertight performance.

Moreover, cast-in-place anchors commonly referred to as J-bolts which have threads on the end opposite the bent end are commonly used for attaching sill plates to poured foundations and the like which require the J-bolts to be manually and individually set in the still wet cement before its cured to provide a better hold for sill plates as opposed to so-called wedge anchors which are used after the cement is cured or for concrete blocks. However, the J-bolts must be placed precisely vertical to the cement slab and at a particular height to align itself with the sill plates to be mounted thereon and this is a time-consuming, tedious and difficult and costly task.

The present invention seeks to overcome this problem by providing a novel anchoring and fastener system which avoids such problems in an advantageous and effective manner.

Accordingly, it is an object of the present invention to provide a novel anchor platform assembly and, in particular, a combined anchor and fastener assembly, usable for a wide variety of applications, and especially intended for anchoring equipment and/or accessory structures to concrete structures, masonry and the like which can accommodate heavy loads, affords an external strong joint, easy and quick installation and also provide waterproof protection at the accessory attachment points, when needed.

It is a further object of the present invention to provide such a novel anchor platform assembly which is relatively simple in design and construction, and is relatively inexpensive to make.

It is a further object of the present invention to provide such a novel anchor platform assembly and a method employing same which can be used for a variety of concrete and masonry structures, including concrete foundations, walls, decks, outdoor balconies, terraces, heated concrete floors and the like.

It is a more particular object of the invention to provide such a novel anchor platform assembly which is more reliable than prior art systems in providing a waterproof connection at the accessory and equipment attachment points.

It is yet a further object of the present invention to provide such a novel anchor platform which is universally adaptable for anchoring, mounting, and/or waterproofing a multitude and wide variety of accessory structures including, inter alia, sill plates, safety rails, lightning rods, antennas, solar panels, satellite dishes, safety rails, glass railings, HVAC heating and air conditioning equipment, decorative sculptures, holiday ornaments, and the like, etc.

SUMMARY OF THE INVENTION

Certain of the foregoing and related objects are achieved according to the present invention, by the provision of an anchor platform assembly for anchoring an object to a concrete structure which comprises an anchor baseplate having a top surface and a bottom surface and at least one throughbore extending from said top surface to said bottom surface thereof. An elongated post is coupled to said anchor baseplate and has a first end and a second end and an at least partially threaded, internal cylindrical bore for receipt therein of a mechanical fastener. The internal bore extends from said first end of said post to at least towards said second end thereof and is in alignment and registry with said anchor baseplate throughbore. The post has a second end portion depending from said bottom surface of said anchor baseplate. The bottom surface of said anchor baseplate is configured to allow at least a portion of the concrete structure to abut and lie generally flush thereagainst except for the area of said bottom surface thereof which is covered by said post. Means are also provided for anchoring said anchor baseplate to a concrete structure. In some embodiments, anchor platform systems and methods are disclosed.

In some embodiments, the post bore extends into said lower end portion of said post. In some embodiments, the bore is a blind bore and has a closed bottom end in the lower end portion of said post. In some embodiments, the post lower end portion serves as a means for anchoring. In some embodiments, the lower end portion is externally threaded. In some embodiments, the lower end portion has a bottom end portion disposed at an angle thereto. In some embodiments, the post has a generally L-shaped profile. In some embodiments, the baseplate bore is cylindrical and internally threaded and merges with said threaded post internal bore. In some embodiments, the post internal bore is cylindrical and is a throughbore extending from the upper end to the bottom end of the post. The means for anchoring are preferably mounted on the post adjacent to the bottom end thereof.

In some embodiments, the means for anchoring comprises a threaded bolt threadably receivable in the threaded post internal bore at the bottom end of post. A washer is mounted on the post having a diameter greater than the post. In some embodiments, the post has an upper end portion extending above said top surface of the anchor baseplate. In some embodiments, the upper end of the post bore is internally threaded. In some embodiments, the post bore is a blind bore having a closed bottom end disposed adjacent the bore of the anchor baseplate.

In some embodiments, the post comprises an at least partially threaded screw. In some embodiments, the anchor baseplate comprises a flange. In some embodiments, the flange is a generally circular, planar flange. In some embodiments, a polygonally-shaped nut having a throughbore is affixed to the top surface of the baseplate with its throughbore in axial alignment and registry with said blind bore of the baseplate. In some embodiments, the polygonally-shaped nut is a hexagonally shaped nut. In some embodiments, the post comprises an elongated tubular neck portion having a throughbore with an open top end and open bottom end. The bottom open end thereof is affixed to the top surface of the baseplate with its throughbore in axial alignment and registry with the blind bore of the baseplate.

In some embodiments, the throughbore of the neck portion is at least partially threaded. In some embodiments, the throughbore has a longitudinally-extended axis and the assembly additionally includes means for rotating the anchor about the axis of the throughbore. The means for rotating comprises a port formed adjacent and within the open top end of the elongated neck portion which is configured and dimensioned to accommodate a tool for rotating the anchor into a support structure. In some embodiments, the throughbore is a blind bore having a longitudinally-extended axis and the assembly additionally includes means for rotating said anchor about the axis of the blind bore.

In some embodiments, the means for rotating comprises a port formed adjacent to and within the open top end of said blind bore. In some embodiments, the port is configured and dimensioned as a flat head screw slot. In some embodiments, the port is configured and dimensioned as an Allen key port.

In some embodiments, the combined anchor and fastening assembly includes a means for fastening an object to said anchor baseplate via the blind bore. In some embodiments, the means for fastening is a threaded bolt. In some embodiments, the combined anchor and fastening assembly includes a means for fastening the anchor baseplate to the support structure with said bottom surface thereof lying generally flush against at least a portion of the support structure except for the area of said bottom surface covered by the post.

In some embodiments, the post comprises an at least partially threaded bolt. In some embodiments, the anchor baseplate comprises a flange. In some embodiments, the flange is a generally circular, planar flange. In some embodiments, a polygonally-shaped nut having a throughbore is affixed to the top surface of said baseplate with its throughbore in axial alignment and registry with the blind bore of said baseplate. In some embodiments, the polygonally-shaped nut is a hexagonally shaped nut.

In some embodiments, the combined anchor and fastening assembly includes an elongated tubular neck portion having a throughbore with an open top end and open bottom end. The bottom open end of the neck portion is affixed to the top surface of the baseplate with its throughbore in axial alignment and registry with the blind bore of the baseplate. The throughbore of the neck portion is at least partially threaded. The neck portion throughbore is advantageously a blind bore which has a longitudinally-extended axis and the assembly additionally includes means for rotating the anchor about the axis of the blind bore.

In some embodiments, the means for rotating comprises a port formed adjacent to and within the open end of the elongated neck portion which is configured and dimensioned to accommodate a tool for rotating the anchor into a support structure. In some embodiments, the blind bore has a longitudinally-extended axis and the assembly additionally includes means for rotating said anchor about the axis of the blind bore. In some embodiments, the means for rotating comprises a port formed adjacent to and within the open top end of the blind bore. In some embodiments, the port is configured and dimensioned as a flat head screw slot. In some embodiments, the port is configured and dimensioned as an Allen key port.

In some embodiments, the combined anchor and fastening assembly includes means for fastening an object to the anchor baseplate via the blind bore. Most desirably, the means for fastening an object comprises a threaded bolt.

In some embodiments, the combined anchor and fastening assembly includes means for fastening said anchor baseplate to the support structure with said bottom surface thereof lying generally flush against at least a portion of the support structure except for the area of said bottom surface covered by said post. The means for fastening comprises a nut.

In some embodiments, the anchor platform assembly comprises a first member having a generally planar first surface and second surface, and at least one throughbore extending from said first surface to said second surface, and at least one elongated second member coupled to said first member and extending at least partially through said throughbore of said first member and projecting outwardly from said first surface thereof, said second member having a first end and a second end and an internal cylindrical bore, at least partially threaded, extending from said first end thereof at least towards said second end and with said first surface of said first member being configured to allow the concrete structure to lie generally flush thereagainst except for the area of said first surface covered by said second member.

In a preferred embodiment of the invention, said means for fastening is a threaded bolt having a straight edge. Most advantageously, said post has a reduced diameter neck portion at least partially receivable in said bore of said anchor baseplate. Most desirably, said means for fastening comprises a nut threadably receivable of an externally threaded post.

Certain of the foregoing and related objects are also achieved according to the present invention by the provision of an anchor platform assembly system for anchoring an object to a structure, such as, e.g., a concrete structure, comprising a first member having a generally planar first surface and second surface, and at least one throughbore extending from said first surface to said second surface, and at least one elongated second member coupled to said first member and extending at least partially through said throughbore of said first member and projecting outwardly from said first surface and second surfaces thereof, said second member having a first end and a second end and an internal cylindrical throughbore formed therein extending from said first end to said second end thereof and with said first surface of said first member being configured to allow the structure to lie generally flush thereagainst except for the area of said first surface covered by said second member; and a pair of hoses, one of which is coupled to said first end of said first end, the other one which is coupled to said end of said post so that a liquid can flow from one of said hoses to the other via the throughbore of said anchor second member.

In some embodiments, an anchor platform assembly system is provided which includes a first member having a generally planar first surface and second surface, and at least one throughbore extending from said first surface to said second surface. At least one elongated second member coupled to said first member and extends at least partially through said throughbore of said first member and projects outwardly from said first surface thereof. The second member has a first end and a second end and an internal, at least partially threaded, cylindrical bore formed therein extending from said first end thereof at least towards said second member second end. The first surface of said first member is configured to allow the concrete structure to lie generally flush thereagainst except for the area of said first surface covered by said second member. A threaded bolt and an enlarged washer is receivable on said threaded bolt which bolt is threadably receivable in said second end of said second member for anchoring said anchor platform in a concrete structure.

The invention also relates to a method of anchoring an object to a concrete structure utilizing a combined anchor and fastening assembly of the type having an anchor baseplate having a top surface and a bottom surface and at least one throughbore extending from said top surface to said bottom surface thereof and, an elongated post coupled to said anchor baseplate having a first end and a second end, and an at least partially threaded, cylindrical internal bore for receipt therein of a mechanical fastener, said inner bore extending from said first end of said post to said second end thereof and being in alignment and registry with said anchor baseplate throughbore and wherein said post has a second end portion depending from said bottom surface of said anchor baseplate, with said bottom surface of said anchor baseplate being configured to allow at least a portion of the concrete structure to abut and lie generally flush thereagainst except for the area of said bottom surface thereof which is covered by said post, and means for anchoring said anchor baseplate to a concrete structure, comprising the steps of (a) placing said anchor and fastening assembly in concrete such that said anchor baseplate is adjacent a top surface of said concrete; and (b) anchoring said assembly in said concrete.

Most preferably, said step (a) is performed before said concrete is cured. Most advantageously, said step (b) is performed by inserting at least a portion of said post into said concrete before said concrete is cured.

BRIEF DESCRIPTION OF THE DRAWINGS

Other objects and features of the present invention will become apparent from the detailed description considered in connection with the accompanying drawings, which disclose several embodiments of the invention. It is to be understood that the drawings are to be used for the purpose of illustration only and not as a definition of the limits of the invention.

FIG. 8b is a side elevational view, in part section, of the flush screw anchor assembly shown in FIG. 8a;

FIG. 8f is a side elevational view, in part section, similar to FIGS. 8b and 8d, but showing the optional provision of an Allen key port;

FIG. 8g is a top plan view similar to FIG. 8e, but showing the optional provision of an Allen key port;

FIG. 8h is a side elevational view of a combined hex head screw anchor and fastener assembly according to a further embodiment of the present invention;

FIG. 8i is a side elevational view, in part section, of the hex head screw anchor assembly shown in FIG. 6;

FIG. 8j is a top plan view, in part section, of the hex head screw anchor assembly shown in FIG. 8b;

FIG. 13b is a top plan view of the long neck anchor shown in FIG. 13a;

DETAILED DESCRIPTION OF THE PREFERRED EMBODIMENTS

Figure 1:
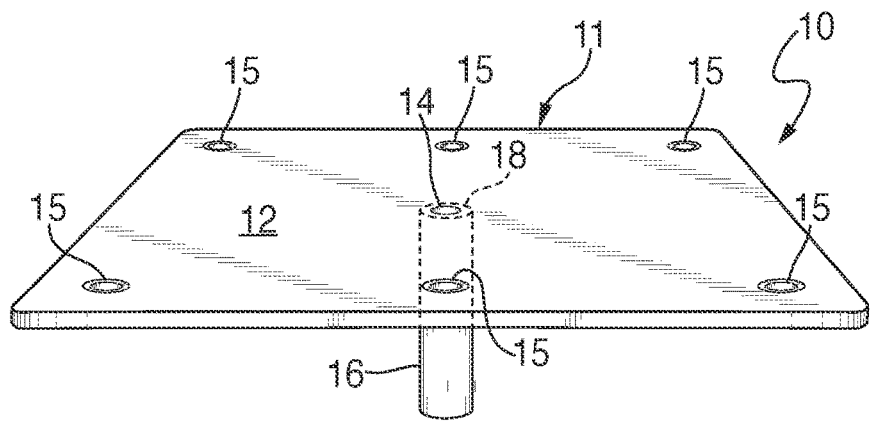
FIG. 1 is a top and side perspective view of a first embodiment of an anchor baseplate utilized in an anchor platform assembly embodying the present invention.
Figure 2:
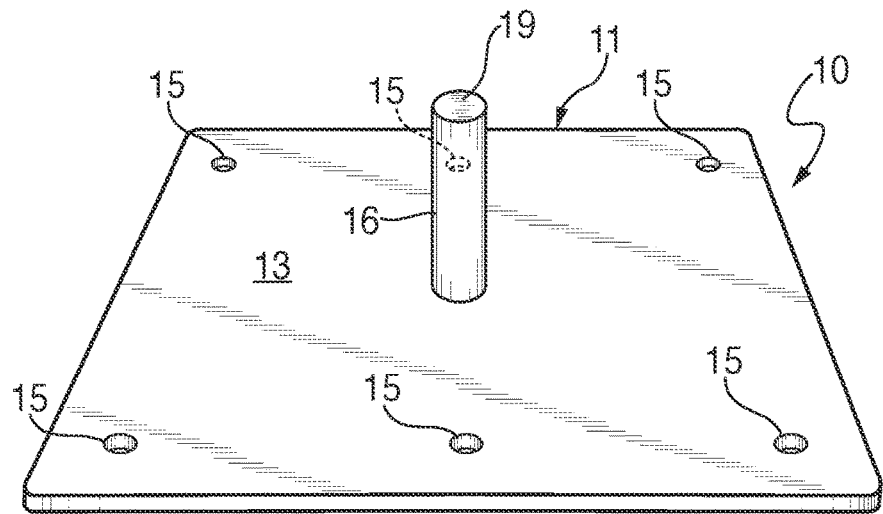
FIG. 2 is a bottom and side perspective view of the anchor baseplate shown in FIG. 1.

The exemplary embodiments of the anchor system and related methods of use discloses are discussed in terms of an anchor platform which is universally adaptable for anchoring, mounting, and/or waterproofing a multitude and wide variety of accessory structures including, for example, sill plates, safety rails, lightning rods, antennas, solar panels, satellite dishes, safety rails, glass railings, HVAC heating and air conditioning equipment, decorative sculptures and/or holiday ornaments.

The anchor system of the present disclosure may be understood more readily by reference to the following detailed description of the embodiments taken in connection with the accompanying drawing figures, which form a part of this disclosure. It is to be understood that this application is not limited to the specific devices, methods, conditions or parameters described and/or shown herein, and that the terminology used herein is for the purpose of describing particular embodiments by way of example only and is not intended to be limiting. Also, in some embodiments, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It is also understood that all spatial references, such as, for example, horizontal, vertical, top, upper, lower, bottom, left and right, are for illustrative purposes only and can be varied within the scope of the disclosure. For example, the references "upper" and "lower" are relative and used only in the context to the other, and are not necessarily superior" and "inferior".

The following discussion includes a description of an anchor system and related components and methods of employing the anchor system in accordance with the principles of the present disclosure. Alternate embodiments are also disclosed. Reference is made in detail to the exemplary embodiments of the present disclosure, which are illustrated in the accompanying figures. Turning to FIGS. 1-14b, there are illustrated components of an anchor system 10, in accordance with the principles of the present disclosure. as more particularly described and shown in Applicant's aforementioned U.S. patent application Ser. No. 15/852,733 and Application No. PCT/US2019/018592 for anchoring objects to a support structure, especially intended for a wide variety of anchoring applications which are universally adaptable to many different fields of use.

With respect to FIGS. 1-4c thereof, therein illustrated is a first embodiment of a novel anchor platform assembly embodying the present invention, generally designed by reference numeral 10, for anchoring accessory structures to support structures, especially useful in the building field structures, such as roofs, foundations, terraces, balconies, stairs, walls and the like. The main component of the anchor platform assembly is the anchor baseplate, generally designated by reference numeral 11, which preferably is made of stainless steel (but could be made of other metals, such as aluminum, bronze, etc.), and is square or rectangular shaped and has a top surface 12 and a bottom surface 13. The anchor baseplate 11 has an internally-threaded central throughbore 14 and six spaced apart peripheral throughbores 15 positioned radially outward from the center bore 14 and generally adjacent to the periphery of the baseplate 11. In this embodiment, the anchor baseplate 11 also includes a preferably cylindrical rod or post 16 having an axially-extending, internally-threaded bore 17 (see FIG. 4b) having a top open end 18 and a closed bottom 19 (FIG. 2) which is secured preferably via welding to the anchor baseplate 11 so that the top open end 18 of its bore 17 abuts and is in registry with the bottom open end of center throughbore 14 (see FIG. 4a).

Figure 3:
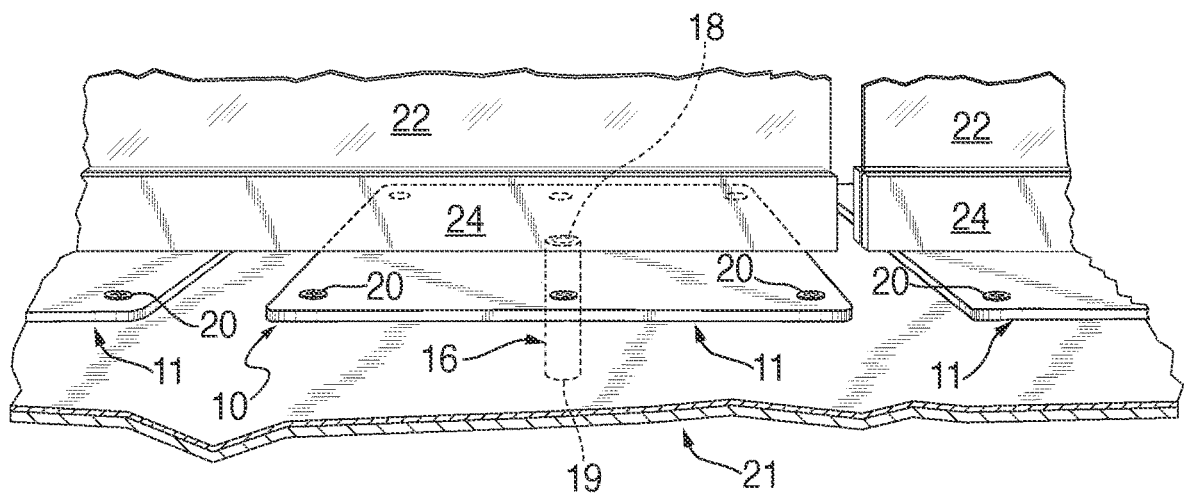
FIG. 3 is fragmentarily-illustrated, perspective view of a first embodiment of the anchor platform assembly embodying the present invention employing a plurality of serially-arranged anchor baseplates mounted on a roof deck and anchoring thereto a plurality of spaced apart elongated rails having U-shaped channel or shoe in which, in turn, is mounted a pair of glass railings.

As shown in FIG. 3, the anchor baseplate 11 of the anchor platform assembly 10 is typically mounted via mechanical fastening elements 20 preferably in the form of nails, bolts, or lag screws, to a roof structure, such as a roof deck, generally designated 21, with its cylindrical post 16 extending through the roof deck 21 and projecting below the roof deck with its closed end 19. The internally threaded and aligned bores 14 and 17 serve as an anchor point for an object to be mounted on the roof deck 21. In this case, the object is a glass railing of the type that has glass panel 22 with a lower edge secured within an elongated U-shaped metal channel or shoe 24. FIG. 3 specifically depicts three serially arranged and spaced apart anchor baseplates 11 to which two glass panels 22 and two shoes 24 are at least partially mounted. In use, such glass railings can be hundreds of feet in length. As can be appreciated, depending on the length of each glass railing 22, two or more anchor baseplates 11 per glass rail 22 may be required as shown in FIG. 3.

Figure 4A:
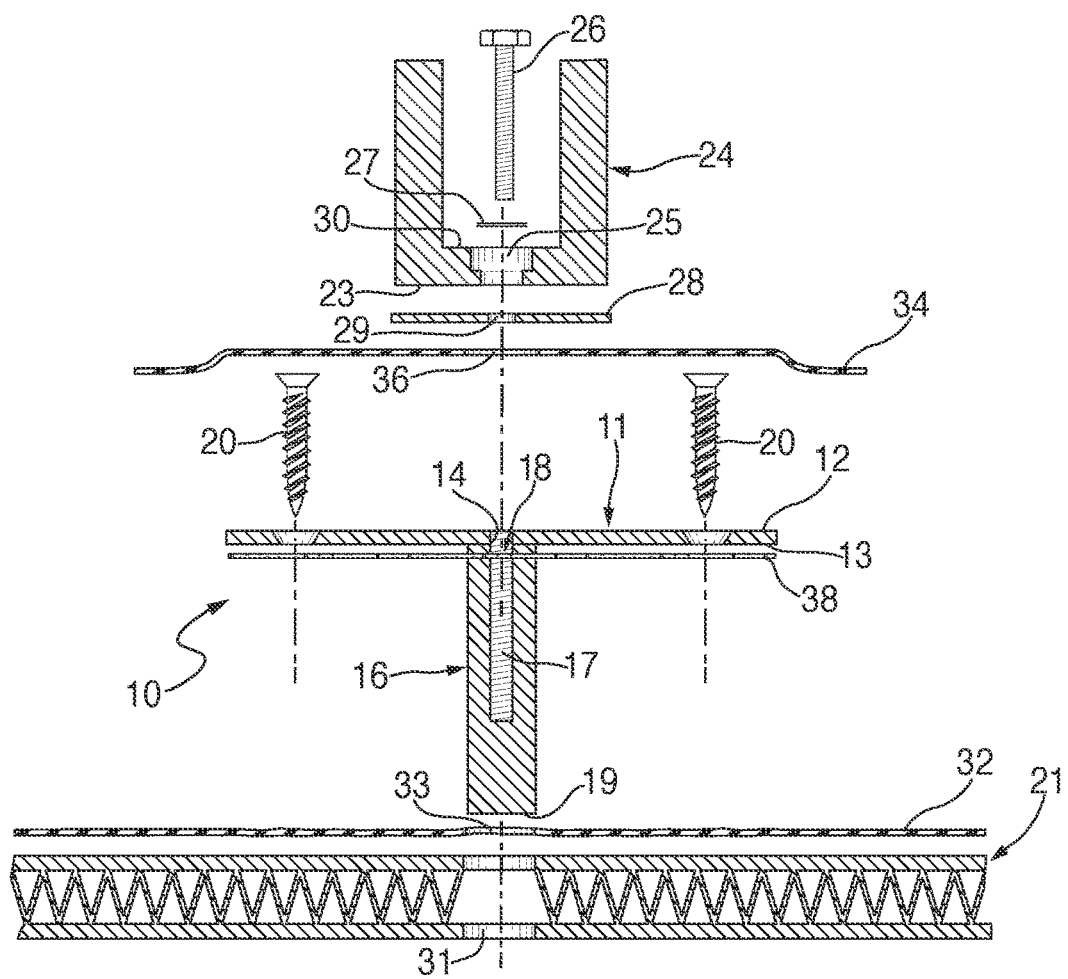
FIG. 4a is an exploded, cross-sectional view of the anchor platform assembly including the anchor baseplate and shim plate shown in FIG. 4a in positional relationship with respect to the U-shaped shoe and the roof deck shown in FIG. 3 and further showing the roof flashing associated therewith including an anchor baseplate membrane and a roof membrane, and the fastening means employed therewith.
Figure 4B:
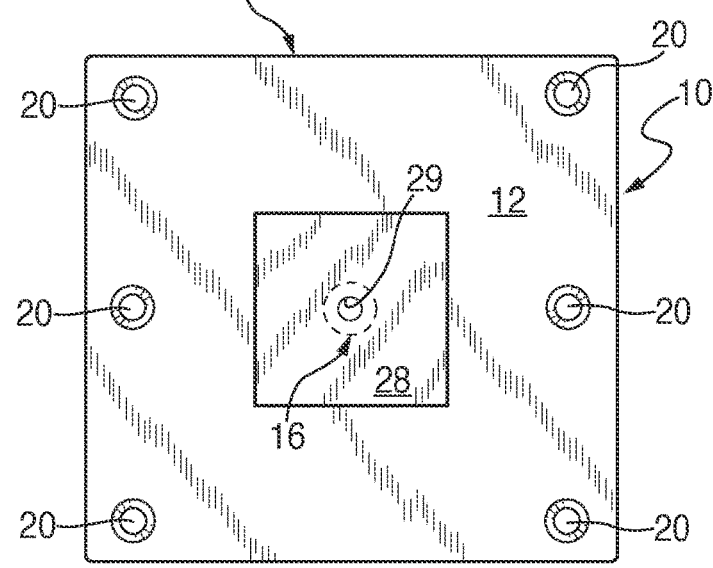
FIG. 4b is a plan view of the anchor baseplate and an optional shim plate centered thereon for adjusting the height of the rail.
Figure 4C:
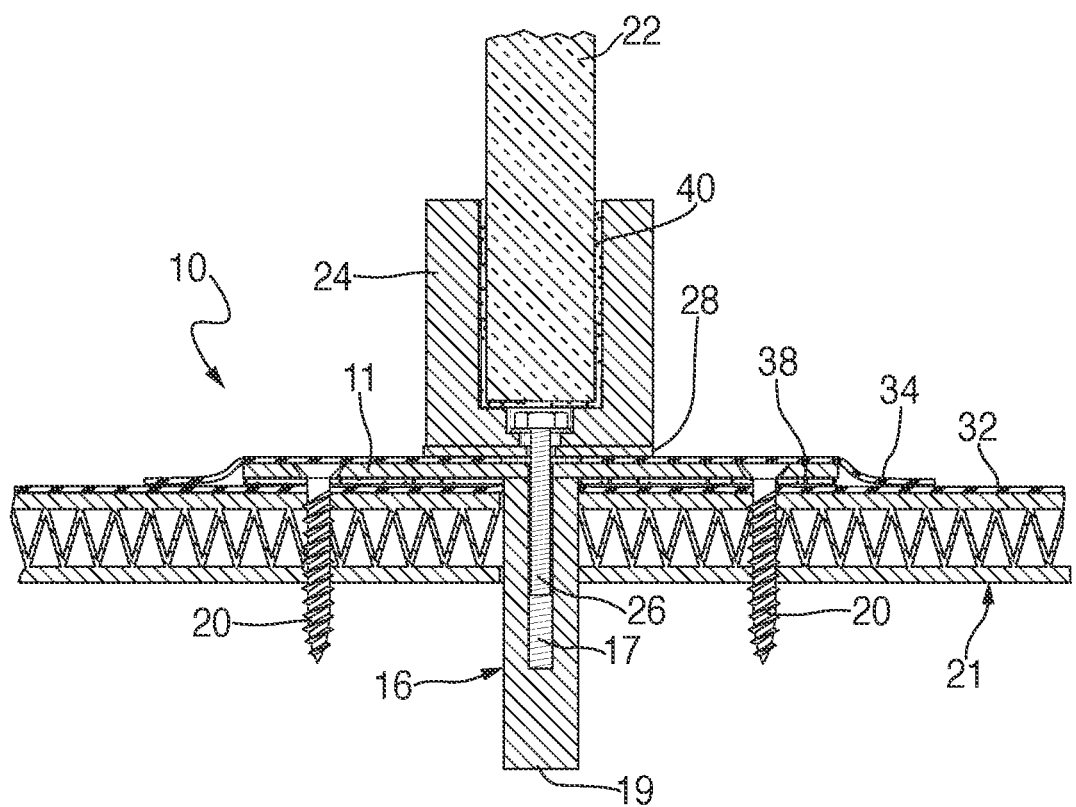
FIG. 4c is a cross-sectional view of the anchor platform assembly shown in FIG. 4b in a fully, mounted state on a roof deck whereby the glass rail is anchored via its U-shaped shoe to the roof, and also showing the use of flashing materials, fasteners and adhesives employed therewith.

As seen best in FIGS. 4a and 4c, the elongated U-shaped shoe 24 has a base wall 23 with a plurality of spaced apart throughbores 25 (one of which is shown). As will be discussed in greater detail hereinafter, cylindrical mechanical fasteners having a straight thread are used, such as a threaded bolt 26, washer 27, which bolt 26 is receivable through the throughbores 25 of the U-shaped shoe 24 and are receivable within the internally-threaded center bore 14 of anchor baseplate 11 and internally-threaded blind bore 17 of the cylindrical post or rod 16 (FIG. 4b) to anchor the same to the roof deck 21. The cylindrical post 16 with the closed bottom 19 serves two purposes: (1) it provides a relatively sturdy and rigid anchoring support point for the object to be mounted on the roof, and (2) it prevents water from penetrating via the central bore 14 into and below the roof deck 21 as a result of blind bore 17 and the bottom end 19 of the cylindrical rod 16 being closed.

FIG. 4b shows the use of a square-shaped shim plate 28 having a central throughbore 29 mounted atop the anchor baseplate 11 such that its central throughbore 29 is directly over and in registry with the internal blind bore 17 of the cylindrical post 16. The shim plate 28 is used to adjust the height of the shoe 24 to ensure proper alignment of adjacent shoes 24 and the glass railing(s) 22 they support due to variations in height of the roof deck 21 or the like. Additional shim plates 28 can, of course, be used, if needed, to achieve proper height alignment.

As illustrated in FIGS. 4a and 4c, the central throughbore 25 of the U-shaped channel or shoe 24 contains a step which is dimensioned and configured to receive and support the bolt head of bolt 26 and washer 27 on the step so that the bolt head of bolt 26 is disposed below the top surface 30 of the lower base wall 23 of U-shaped shoe 24 so as not to abut and possibly crack or damage the bottom edge of the glass railing 22.

FIGS. 4a and 4c respectively show an exploded cross-sectional view and a fully mounted cross-sectional of the anchor platform assembly 10 which include preferred flashing materials, fasteners and adhesives and the like for mounting a glass railing to a roof deck or terrace or the like. As shown in FIG. 4a, the anchor baseplate 11 is positioned above the roof deck 21 which may be of wood, metal or composite construction as is standard or conventional in the industry. The cylindrical post 16 of the anchor baseplate 11 is intended to be inserted through a throughbore 31 in the roof deck 21 and a conventional rubber roof membrane 32, preferably made of neoprene, which also has a throughbore 33, is preferably interposed between the anchor baseplate 11 and roof deck 21. Similarly, a conventional rubber roof membrane 34, also preferably made of neoprene, is preferably positioned between the optional shim plate 28 and the top surface 12 of the anchor baseplate 11 and it too is provided with a central bore 36 to allow the bolt 26 to pass through the membrane 34. In addition, a sealant, cement, caulk or adhesive layer 38 is shown which would normally be applied to the bottom surface 13 of the anchor baseplate 11 to adhesively join and seal the same to the roof membrane 32.

As also shown in FIG. 4c, an adhesive, caulk, cement or glue 40 (and/or optionally clips) is also applied to the inner surface of the U-shaped channel 24 so that it surrounds the lower end of glass railing 22 received within the U-shaped metal channel 24. As also illustrated therein, the anchor baseplate membrane 34 extends over the entire anchor baseplate 11 with its ends sealed against the roof membrane 32 thereby sealing the screw holes and the remainder of the anchor baseplate 11. As can be appreciated, these flashing materials and adhesives serve to waterproof the assembly and protect the roof from leaks.

As previously mentioned, this is particularly important at the point of attachment of the object to the roof which, in this case, refers to the point of attachment of the glass railing shoe 24 to the anchor baseplate cylindrical post 16 via bolt 26 and the threaded blind bore 17 in which the bolt 26 is received. Since bore 17 is a blind bore or hole and the bottom end 19 of the cylindrical post 16 is closed, the potential path of any water that could conceivably penetrate between the glass panel 22 and the U-shaped channel 24 and enter the bore 17 of the cylindrical post 16 is totally blocked from penetrating the roof deck 21.

Figure 5A:
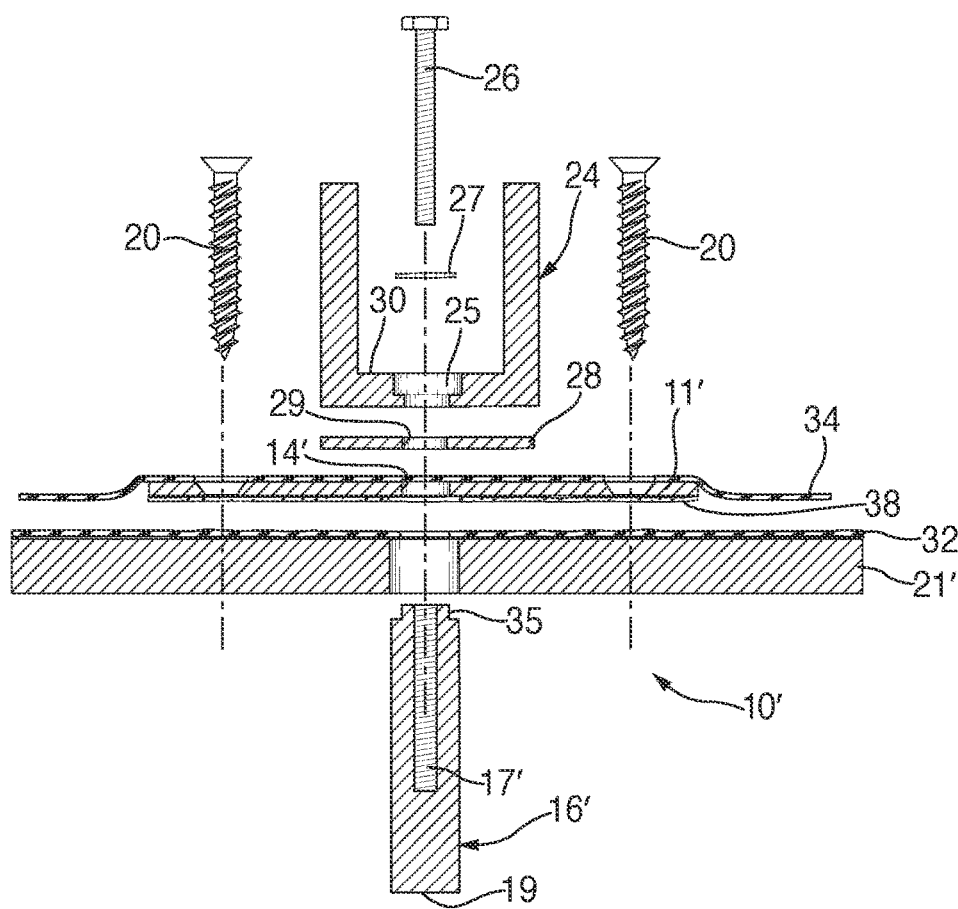
FIG. 5a is an exploded, cross-sectional view of a second embodiment of the anchor platform assembly comparable to FIG. 4b, but showing the anchor baseplate having an internally threaded post with a reduced width neck section.
Figure 5B:
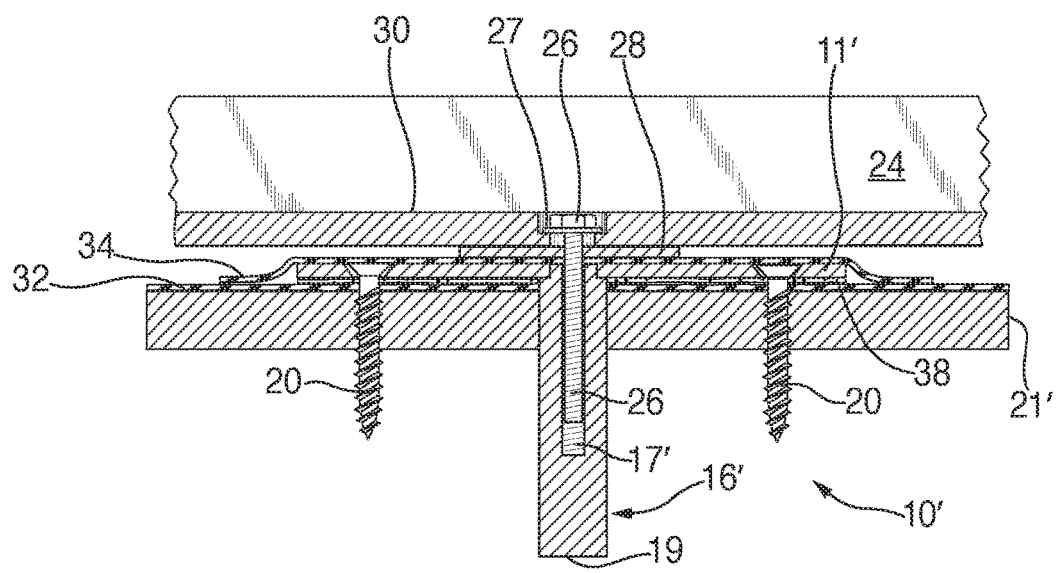
FIG. 5b is a cross-sectional view of the second embodiment of the invention in a fully mounted state, comparable to FIG. 4c, but showing the use of an internally threaded post with a reduced width neck section seated within the central bore of the anchor baseplate.

FIGS. 5a and 5b illustrate a second embodiment of the anchor baseplate assembly and, in a similar fashion, respectively show an exploded cross-sectional view and a fully mounted cross-sectional view of this second anchor platform assembly embodiment.

The elements shown in this second embodiment are the same as shown in FIGS. 4b and 4c with the exception that the cylindrical post 16' is provided with a narrow neck portion 36 and the baseplate 11' is provided with a non-threaded central bore 14', but both are otherwise identical to the baseplate 11 and cylindrical post 16 shown in the previous embodiment. In FIGS. 4b and 4c the top end 18 of the cylindrical post 16 would typically be welded to the bottom surface 13 of the anchor baseplate 11. In FIGS. 5a and 5b however, the narrow neck section 36 is intended to be received within the non-threaded central bore 14' of the anchor baseplate 11' and, as a result of this construction, a more robust and stronger bond is made. The stronger bond is due to the fact that when said anchor plate 11' and post 16' are welded together, the respective center bore 14' and internal threaded bore 17' are held in proper and perfect alignment by the abutment and receipt of the reduced neck section 36 of the post 16' in the center bore 14', prior to and during welding.

Figure 6:
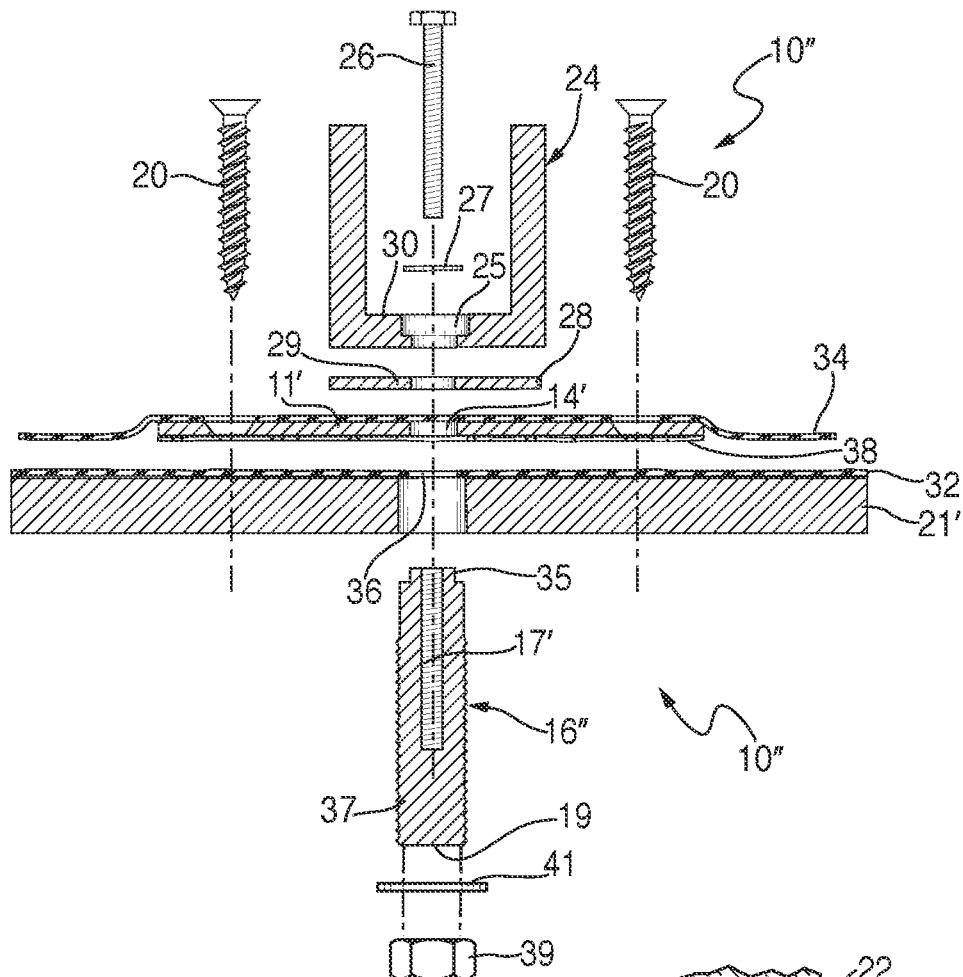
FIG. 6 is an exploded, cross-sectional view of a third embodiment of the anchor platform assembly comparable to that shown in FIGS. 4b and 5a, but showing an anchor baseplate having an externally threaded post.
Figure 7:
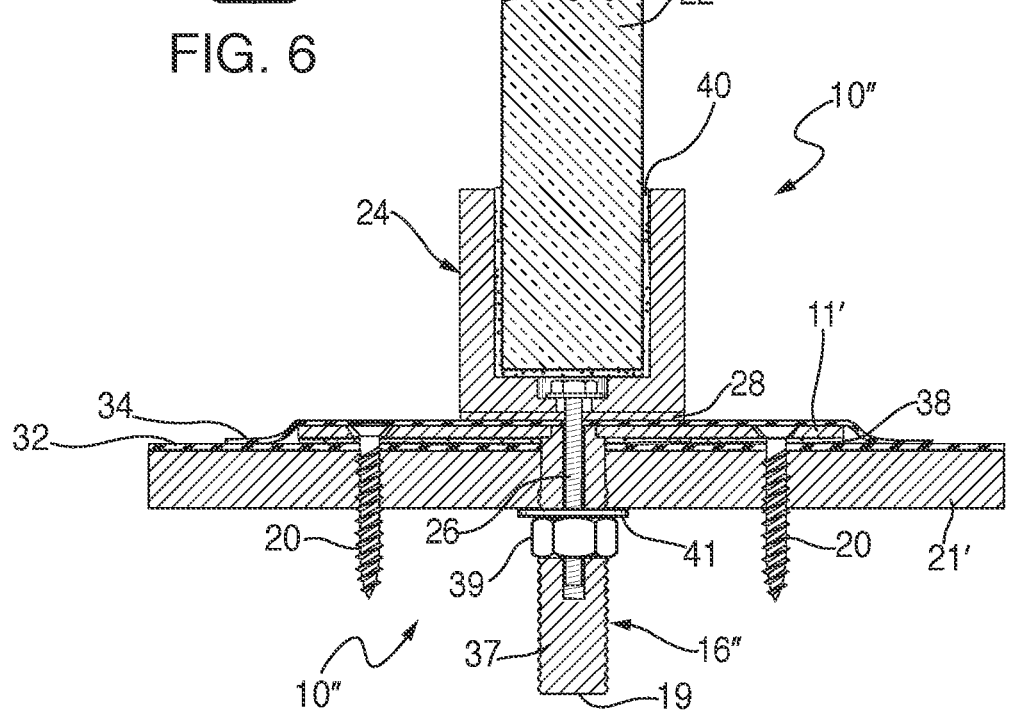
FIG. 7 is a cross-sectional view of the third embodiment of the anchor platform assembly in a fully mounted state comparable to that of FIGS. 4 and 5b, but showing the externally threaded post securing the anchor baseplate to the roof deck from beneath the roof deck via a nut and a washer.

FIGS. 6 and 7 illustrate a third embodiment of the anchor baseplate assembly 10" and, in a similar fashion, respectively show an exploded cross-sectional view and a fully mounted cross-sectional view of this third anchor platform assembly embodiment. The elements shown in this third embodiment are the same as shown in FIGS. 5a and 5b with the exception that the lower portion 38 of cylindrical post 16" is externally threaded but is otherwise identical to the cylindrical post 16'. In this embodiment, a nut 39 and washer 41 are threaded onto the externally threaded surface 38 of the cylindrical post 16" so that in the fully assembled state shown in FIG. 7, the nut 39 and washer 41 are tightened against the lower surface of the metal roof deck 21' to provide a stronger point of attachment while, at the same time, preventing roof leaks at the point of attachment via the blind bore 17' and the closed end 19 of the cylindrical post 16".

Figure 8A:
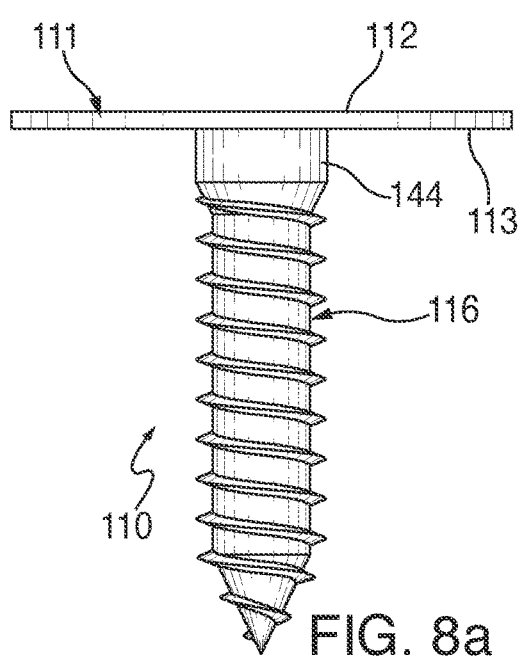
FIG. 8a is a side elevational view of a combined flush screw anchor and fastener assembly according to the present invention.
Figure 8B:
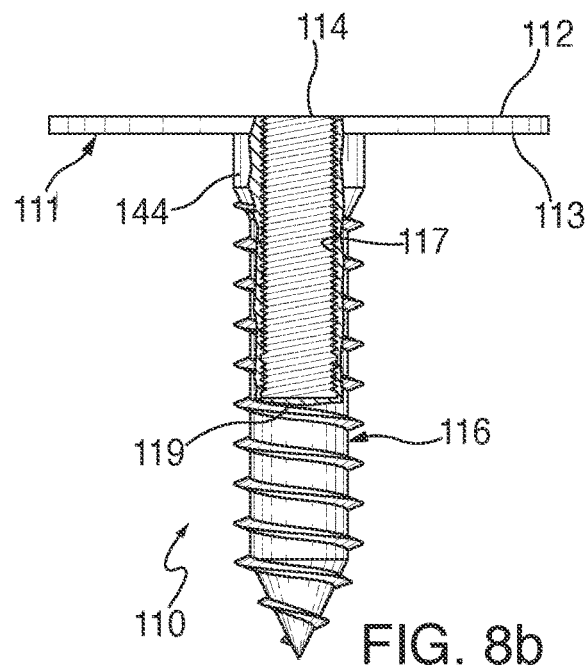
Figure 8C:
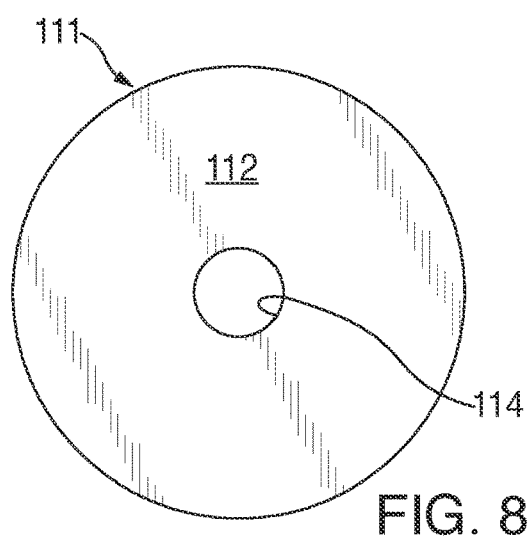
FIG. 8c is a top plan view of the flush anchor flange assembly shown in FIGS. 8a and 8b.

Turning now, in particular to FIGS. 8a-8m therein illustrated are several embodiments of the novel screw anchor and fastener assemblies (hereinafter generally referred to as "screw anchors" or "screw anchor assemblies") according to the present invention, as shown and described in Applicant's earlier filed continuation-in-part PCT Application No. PCT/US2019/018592. As shown in FIGS. 8a-8c, anchor assembly 110 is a flush screw anchor and is particularly useful in the building trade for a myriad of uses. Flush screw anchor assembly 110 comprises a preferably planar baseplate, flange or washer 111 having an upper surface 112, an opposite lower surface 113, and an optionally-internally-threaded central opening 114 extending therethrough. Additionally, screw anchor assembly 110 also includes an externally-threaded post, preferably in the form of a screw or a lag screw 116 secured to anchor baseplate 111 and extending downwardly from lower surface 113 of baseplate 111. As shown best in FIG. 8b, the upper shaft of screw 116 includes an axially-extending, internally-threaded central bore 117 which merges with and is axially aligned with central opening 114 of baseplate 111. Bore 117 has a diameter smaller than the external diameter of the externally-threaded upper shaft of screw 116.

Bore 117 in screw 116 is a blind bore having an open top end defined by the bore 114 in flange or baseplate 111 and a closed bottom end 119 in the shaft of screw 116. It is also preferred that screw 116 and baseplate 111 are integrally joined to form a one-piece combined anchor and fastener assembly or component. Screw 116 can be secured to baseplate 111 via welding, a press-fit connection or by any other fastening means that would ensure that screw 116 and baseplate 111 are securely and rigidly fastened together to provide a strong and robust anchor.

As will be shown and discussed hereinafter in relationship to the installation and use of the screw anchors of the present invention for this embodiment and the other embodiments described herein, a fastener typically in the form of bolt 26 having an enlarged head and a threaded straight edge together with a washer 27 as shown in FIGS. 4a, 4c, 5a, 5b, 6 and 7 is threadably receivable in the bore 117 to hold and securely fasten an object to the anchor so that the object, or part thereof or an associated accessory structure therefor (as to the latter, see, e.g., the U-shaped shoe 24 used to support a glass panel 22 for a roof railing), is securely held fast against the upper surface 112 of anchor baseplate 111. This is accomplished preferably by providing a throughbore 25 in the object, part or accessory structure therefor, through which the threaded shaft of the bolt 26 is passed through before it is threaded into the blind bore 117 of the screw anchor 110 and tightened to securely fasten the object to the screw anchor.

Figure 8D:
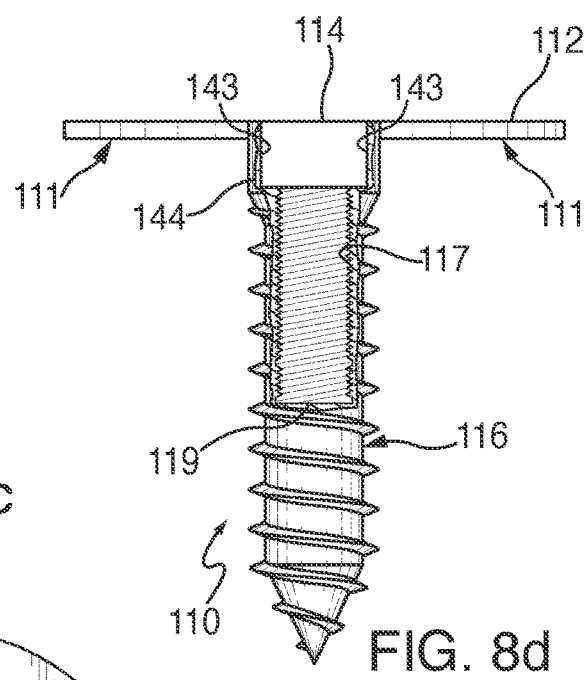
FIG. 8d is a side elevational view, in part section, similar to FIG. 8b, but showing the optional provision of a flat head screwdriver port.
Figure 8E:
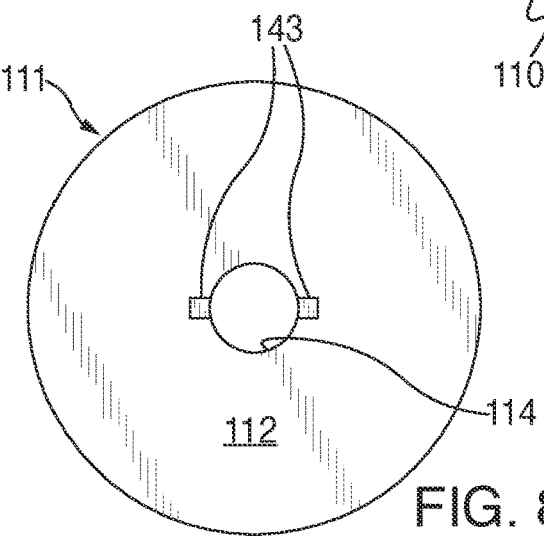
FIG. 8e is a top plan view similar to FIG. 8c, but showing the optional provision of a flat head screwdriver port.

FIGS. 8d and 8e illustrate a modification of the flush anchor embodiment shown in FIGS. 8a-8c, wherein a recessed, flat head screw slot or port 143 is formed in baseplate 111 on opposite sides of its central bore 114 which extends therebelow into the upper, externally smooth and enlarged head portion 144 of lag screw flush anchor 110 on opposite sides of its central bore 117 to allow a flat head screwdriver or other tool (not shown) to be inserted into said slot 143 to facilitate turning of the externally-threaded shaft of screw 116 to either screw the anchor 110 into the intended supporting structure or to threadably remove it therefrom, if e.g., it needs to be repositioned in the building supporting structure.

FIGS. 8f and 8g illustrate another modification of the screw anchor assembly shown in FIGS. 8a-8c, wherein instead of the employment of a flat head screwdriver port 143, an Allen key port 145 is provided. More particularly, a countersunk hexagonal head space is provided above the top end of the blind bore 117 in the upper, externally smooth enlarged head portion 144 of lag screw anchor 110 extending downwardly from the top surface 112 of washer 111. The enlarged cylindrical head portion 144 of lag screw anchor 110 has an hexagonal inner wall surface 146 defining Allen key port 145. The Allen key port 145 is designed to receive an Allen key (not shown) by which the flush screw anchor 110 can be easily and threadably screwed into, and removed from the support structure, as described and illustrated in greater detail hereinafter.

In yet another embodiment of the screw anchor assembly of the present invention, as shown in FIGS. 8h-8j, a hex head lag screw anchor 210 is provided having a hexagonal hex nut 250 secured atop upper surface 212 of baseplate 211. The hexagonal hex nut 250 serves the same purpose as the screwdriver slot, Allen key port, or the like, whereby a tool such as a socket wrench (not shown) can be used which is configured to grip the hex head to facilitate its threaded engagement into, or removed from a support. External hex nut 250 is preferably integrally joined to baseplate 211, such as by welding, to form a one-piece component. As shown best in FIG. 8i, external hex nut 250 contains an internally-threaded, central throughbore 252 which is in axial alignment and registering with central bore 217 of lag screw 216 and bore 214 of baseplate 211. While anchor 210 is illustrated and described as having a hexagonal shaped nut 250, other polygonal or geometric shapes are possible and contemplated by the present invention and as further disclosed below.

Figure 8K:
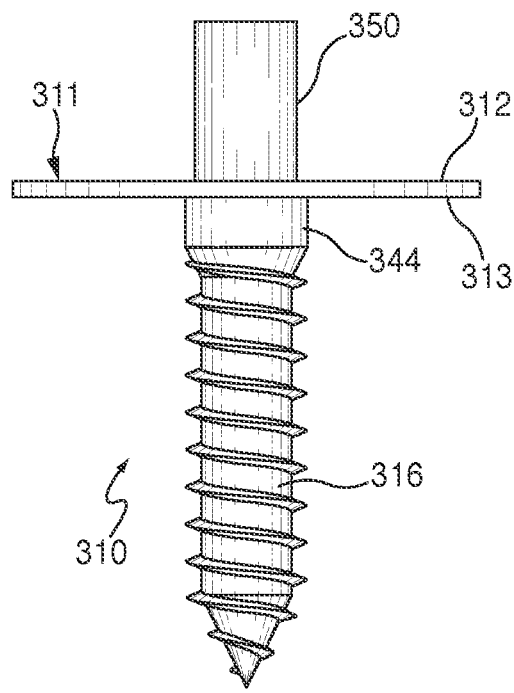
FIG. 8k is a side elevational view of a combined long neck screw anchor and fastener assembly according to another embodiment of the invention.
Figure 8M:
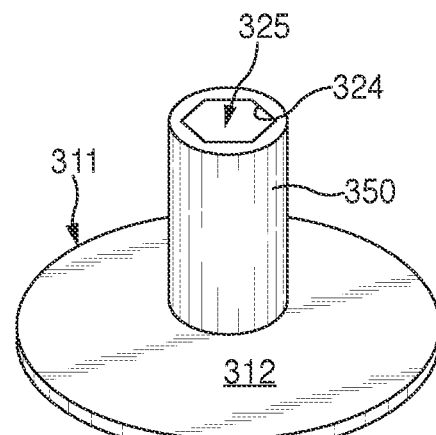
FIG. 8m is a perspective view of the long neck screw anchor assembly shown in FIG. 8l.
Figure 8L:
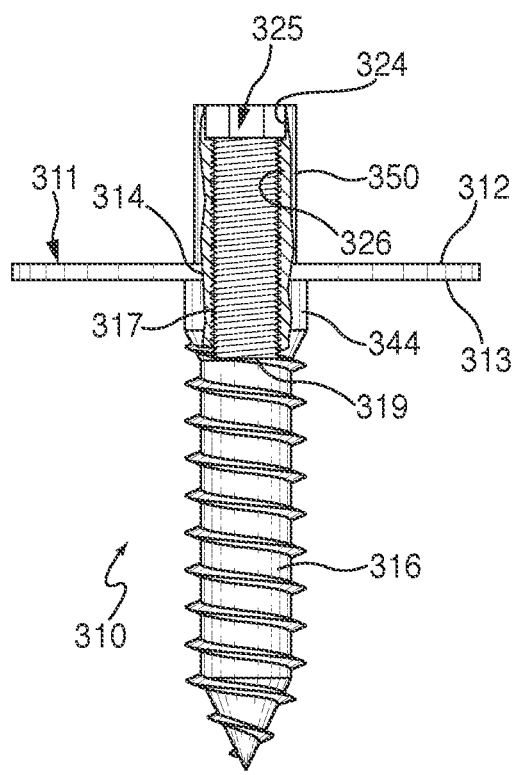
FIG. 8l is a side elevational view, in part section, of the long neck screw anchor assembly shown in FIG. 8k.

Turning now to FIGS. 8k-8m, therein illustrated is a further embodiment of a novel, extended, elongated or "long neck" lag screw anchor assembly according to the present invention, generally designated by reference numeral 310. The anchor 310 includes a preferably radially-extending, disk-like, annular baseplate, flange or washer 311 having an upper planar surface 312 and an opposite lower planar surface 313, the latter of which is also preferably welded to the top end of lag screw anchor 316. The so-called "extended" or "long neck" 350 comprises an elongated, hollow tube or collar which is attached at its bottom end, preferably via welding, to flange 311. Alternatively, long-neck 350 can be made integral with post 316 provided the diameter of opening 314 is large enough to allow neck 350 to pass therethrough prior to welding to flange 311.

The neck 350 is preferably substantially cylindrical, but is not limited to any particular geometrical shape as discussed further below. As shown best in FIG. 8m, long neck 350 has a central bore defined by an inner surface 324 adjacent its open top end which is preferably hexagonal to define an Allen key port 325, and the lower end of inner surface 324 merges with threaded internal throughbore 326 disposed therebelow. As in the other embodiments, an Allen key tool (not shown) can be inserted into the Allen key port 324 to facilitate and effect its threaded engagement into and from a support structure.

Figure 9B:
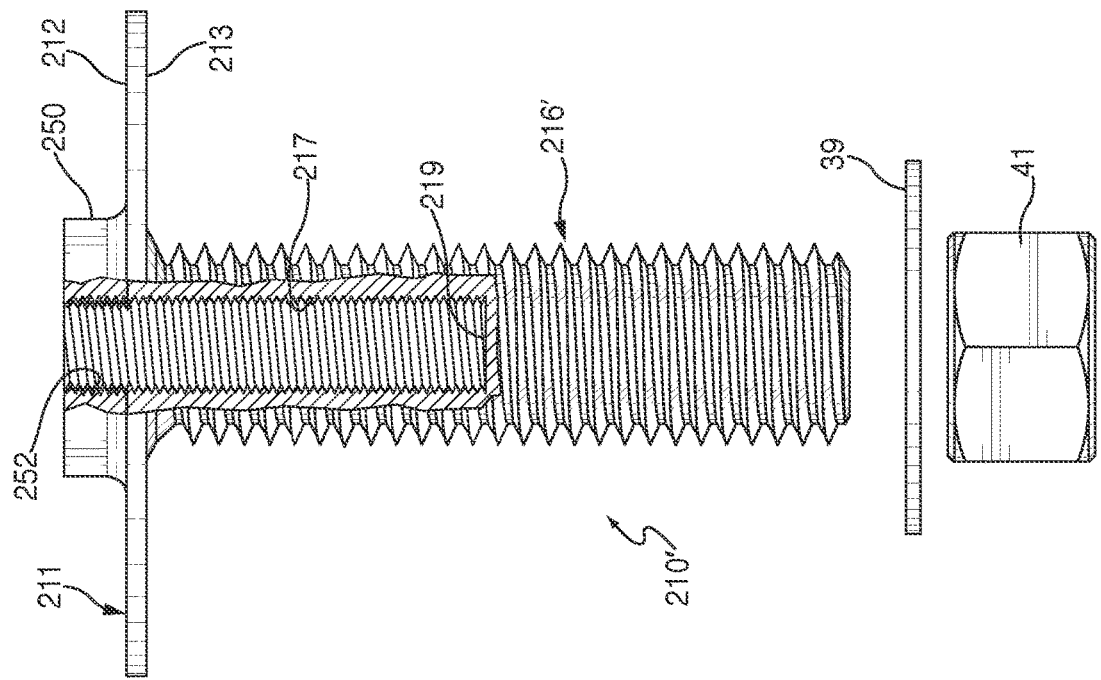
FIGS. 9a, 9b, and 9c are side elevational views, in part section, of bolt anchor assemblies corresponding to the first, second and third embodiments, respectively, utilizing a bolt with a central blind bore rather than a screw.
Figure 9A:
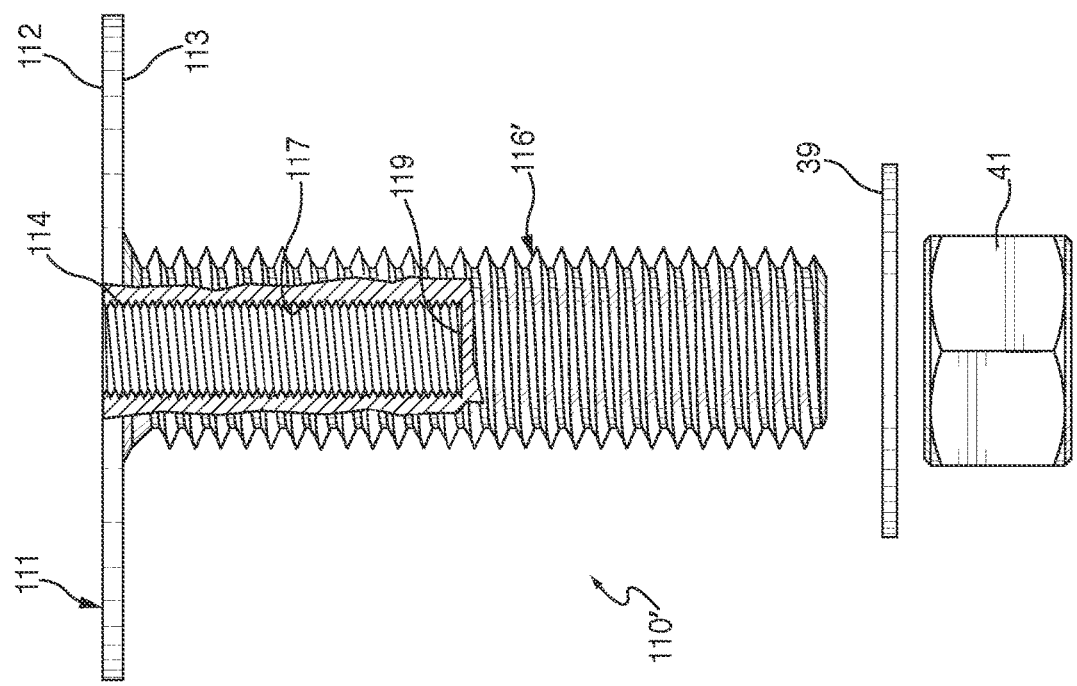

FIG. 9a illustrates a flush bolt anchor assembly 110' wherein the threaded flush anchor screw 116 shown in FIGS. 8a-8g is replaced by threaded bolt 116' affixed to flange 111 and having a blind bore 117. The threaded bolt 116' would be screwed into and through a support structure until baseplate 111 would abut and lie flush on the top surface of the support structure and its lower end would pass through a throughbore in the support structure to allow a washer 39 and nut 41 to be placed and threaded on bolt 116', and fully tightened to sandwich and securely anchor the support structure between baseplate 111 and washer 39.

FIG. 9b illustrates a hex head bolt anchor assembly 210' wherein the threaded screw 216 shown in FIGS. 8h-8j is replaced by threaded bolt 216' having a blind bore 217 and a hex nut 250 affixed to flange 211. Here too, the threaded bolt 216' would be screwed into and through a support structure until its baseplate 211 would abut and lie flush on the top surface of the support structure and the bolt 216' would pass through the support structure to allow a washer 39 and nut 41 to be placed and threaded thereon to sandwich the support structure between its baseplate 211 and washer 39.

Figure 9C:
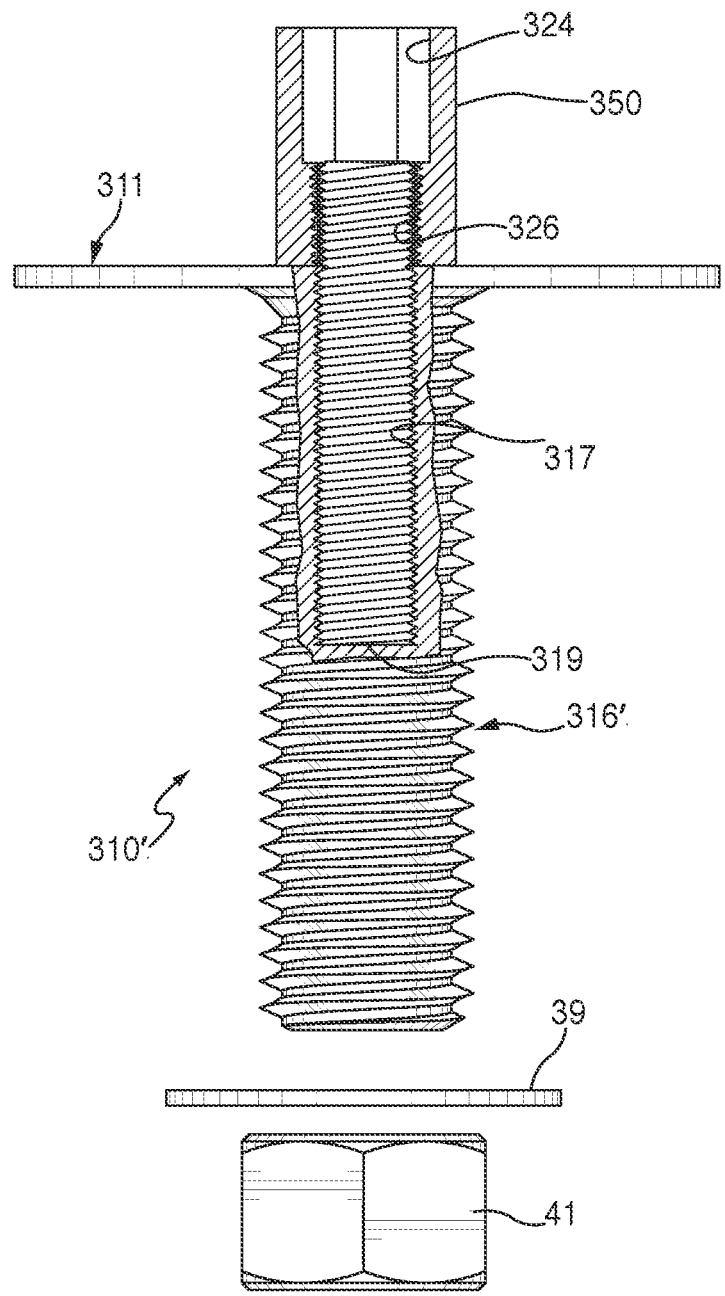

FIG. 9c illustrates a long neck bolt anchor assembly 310' wherein the threaded screw 316 is replaced by threaded bolt 316' having a long neck 350 affixed to flange 311 and a blind bore 317. The threaded bolt 316' would be screwed into and/or inserted through a support structure until its baseplate 311 would abut and lie flush on the top surface (or one side) of the support structure. At the same time, the lower end of bolt 316' would pass through the bottom (or other side) of the support structure to allow a washer 39 and nut 41 to be placed and threaded thereon to securely anchor the anchor assembly 310' to the support structure, which, in turn, would be sandwiched between base plate 311 and the washer 30 and nut 42.

Turning now to FIGS. 10-13, therein illustrated are four embodiments of the invention modified especially for use in concrete and masonry installations, such as concrete foundations. As seen in FIGS. 10a, 10b and 10c, this embodiment of an anchor platform 10''' embodiment is based upon the anchor base plate assembly of FIGS. 1-7b, and is more closely comparable to the anchor baseplate of FIGS. 5a and 5b with the internally-threaded, reduced width neck portion 35, although the other embodiments thereof are applicable as well. As shown, the square-shaped base plate 11" is essentially the same, but without holes 15 and the smooth cylindrical post 16' is provided with an internally threaded throughbore 17' open at both its top end 18 and bottom end 19'. A washer 39' having a diameter greater than the diameter of post 16' is mounted on the threaded shaft of bolt 26 whose free threaded end is threadably receivable in the bottom open end 19' of the threaded throughbore 17' of cylindrical post 16' whereby the bolt 26 and washer 39' serve as an anchor to fix the baseplate 11' and post 16' in the cement when cured. As can be appreciated, the base plate 11' and post 16' are placed into the cement before it sets and positioned so the top surface 12' of the anchor baseplate is flush with the top face 52 of the cement footing or foundation 50. Once the cement is fully set, the anchor baseplate 11' and cylindrical post 16' are firmly anchored in the foundation by washer 39'. As can be further appreciated, in this embodiment, it is not required to use screw fasteners 20 or the like as in FIGS. 5a and 5b, since the baseplate holes (not shown), if optionally provided, fill with cement to further anchor the baseplate to the surrounding cement.

Figure 10A:
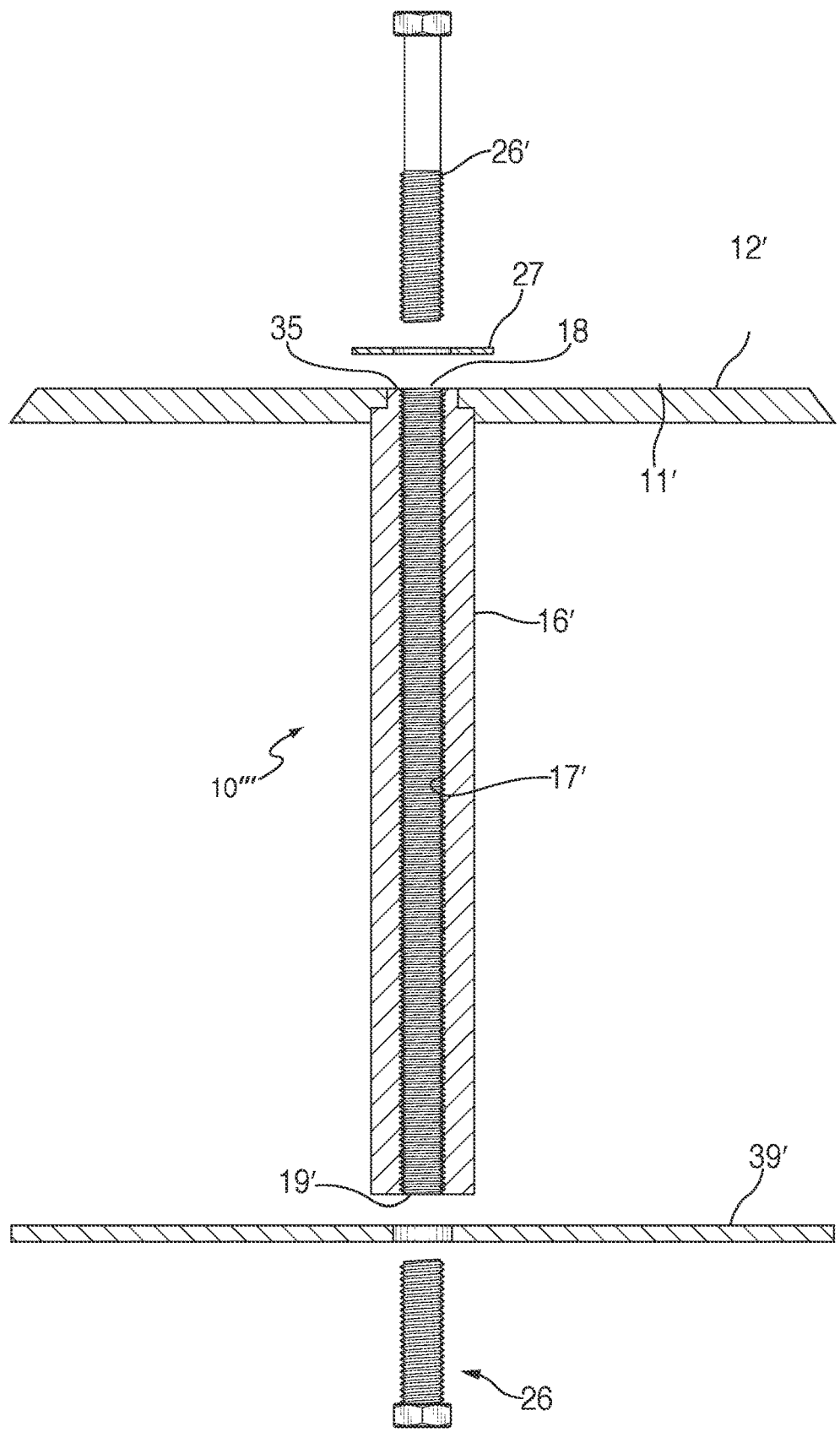
FIG. 10a is a side elevational view, in part section, of a further embodiment of the flush anchor assembly.
Figure 10B:
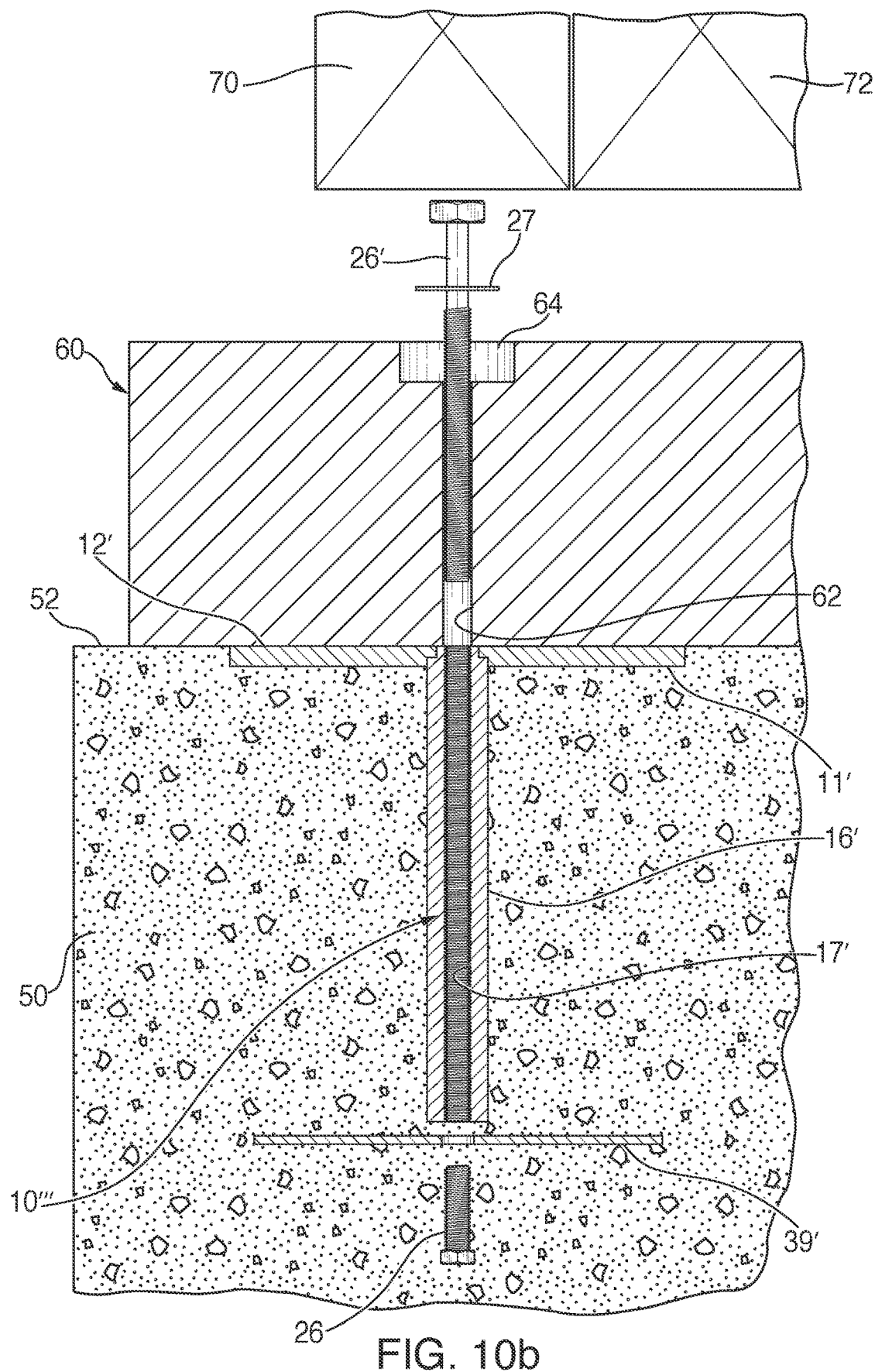
FIG. 10b is a partially exploded, side elevational view, in part section, of the anchor base plate shown in FIG. 10a, embedded in a poured cement footing and showing the mounting of a sill plate thereon and side wall and its associated bolt thereabove with an anchor therebelow in the cement footing, and its associated bolt prior to fastening.
Figure 10C:
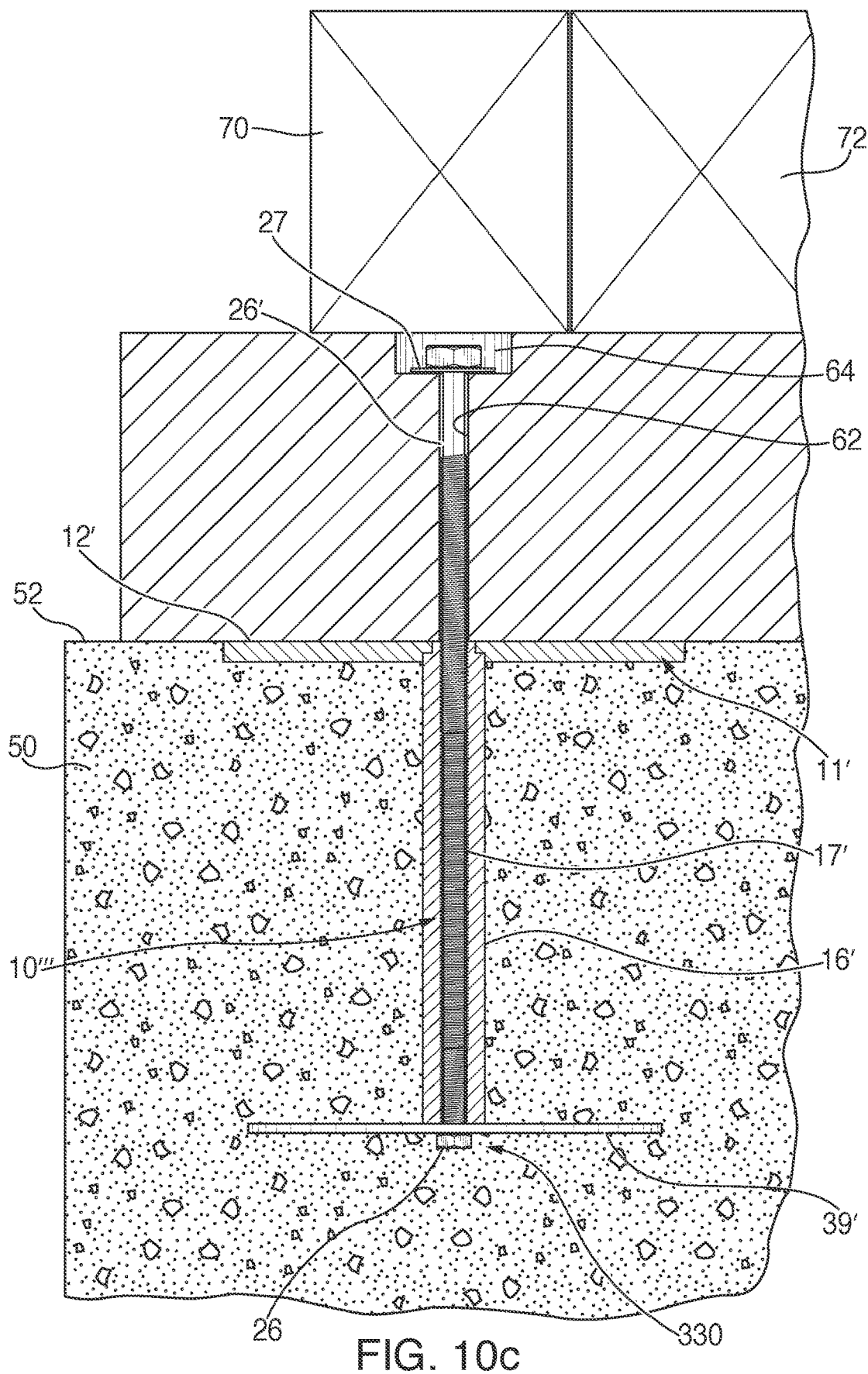
FIG. 10c is a side elevational view, in part section, similar to FIG. 10b, but showing the bolt fully fastened and received through the sill plate and into the blind bore of the post of the anchor base plate and with the anchor mounted in the bottom end of the post in the cement footing.

Once the cement 50 fully cures and sets, the anchor base plate assembly 10''' is ready for fastening to an accessory as seen best in FIG. 10b and FIG. 10c. In this illustrated example, a sill plate 60 preferably made of wood and having a center and vertical throughbore 62 aligned with throughbore 17' of anchor baseplate assembly 10''' is positioned on baseplate 11' and a lag bolt 26' with a washer 27 mounted thereon is then inserted into throughbore 62 extending through the sill plate 60 so that the bolt 26' can be threadably received in the threaded throughbore 17' of post 16' and then tightened to securely affix the sill plate 60 to the anchor baseplate 11' and, in turn, the cement foundation 50 (FIG. 10c). Preferably, the top of the sill plate 60 has a recess 64 above its throughbore 62 so the head of the bolt 26' and washer 27 lies within the recess 64 when fully inserted and tightened. This allows the accessory structure, in this case, a double-walled sidewall 70, 72, to be mounted flush on top of sill plate 60.

It should be noted that other anchor designs, aside from the anchor 10''', can, of course, be used so long as it securely anchors the baseplate 11' and post 16' in the cement 50. Moreover, the externally threaded post 16'' embodiment of FIGS. 6 and 7, could also possibly be used in which case, a nut 39 and enlarged washer 41 could be used which would be dimensioned to be threadably receivable on the end of the externally threaded post 16'' to also serve in a similar fashion as an anchor for anchor baseplate assembly 10'''.

Figure 11A:
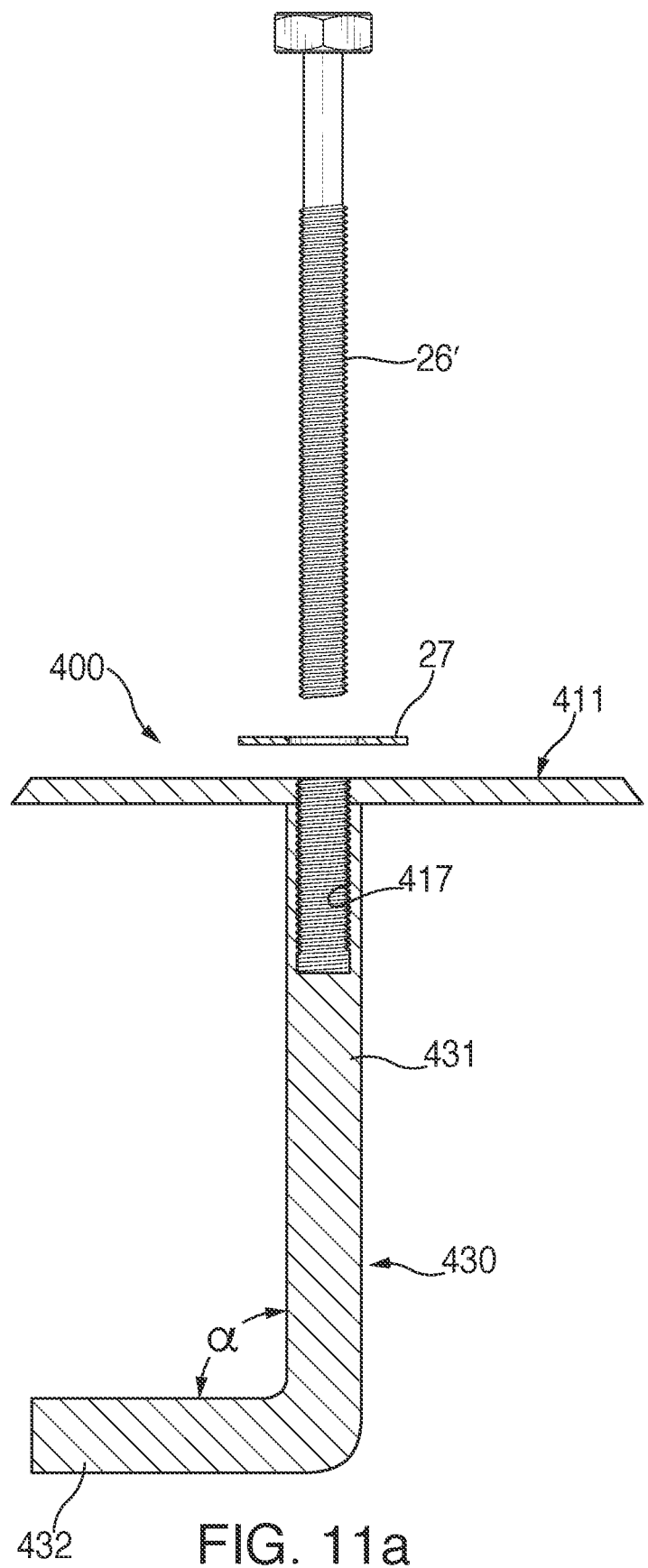
FIG. 11a is a side elevational view, in part section, of a further embodiment of the flush anchor assembly shown in FIGS. 8a-8g, but having a J-bolt-like anchor especially intended for use in poured concrete structures.
Figure 11B:
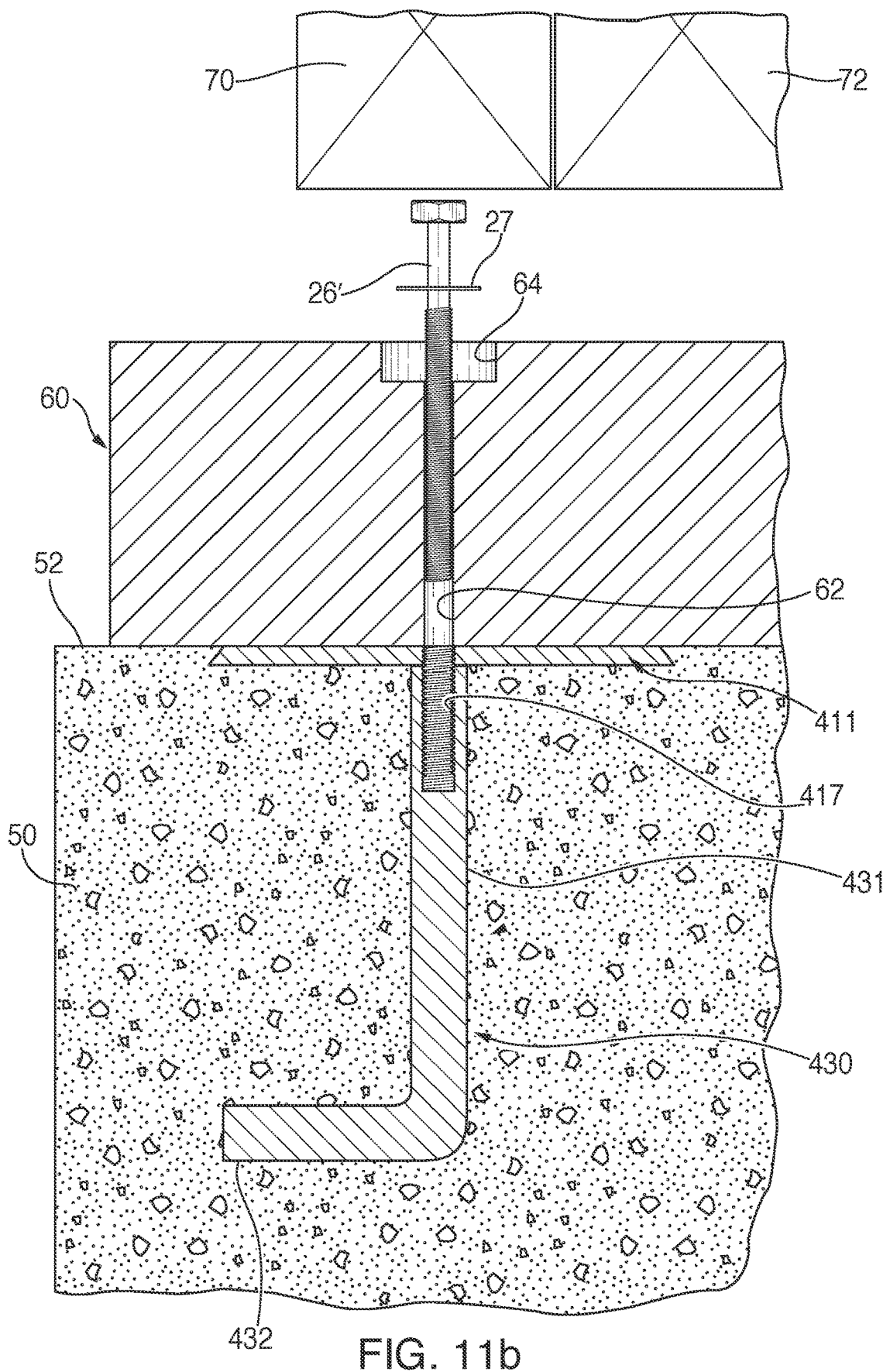
FIG. 11b is a partially exploded side elevational view, in part section, of the flush anchor shown in FIG. 11a, embedded in a poured cement footing and showing the positioning of a sill plate, side wall and its associated bolt thereabove, prior to fastening.
Figure 11C:
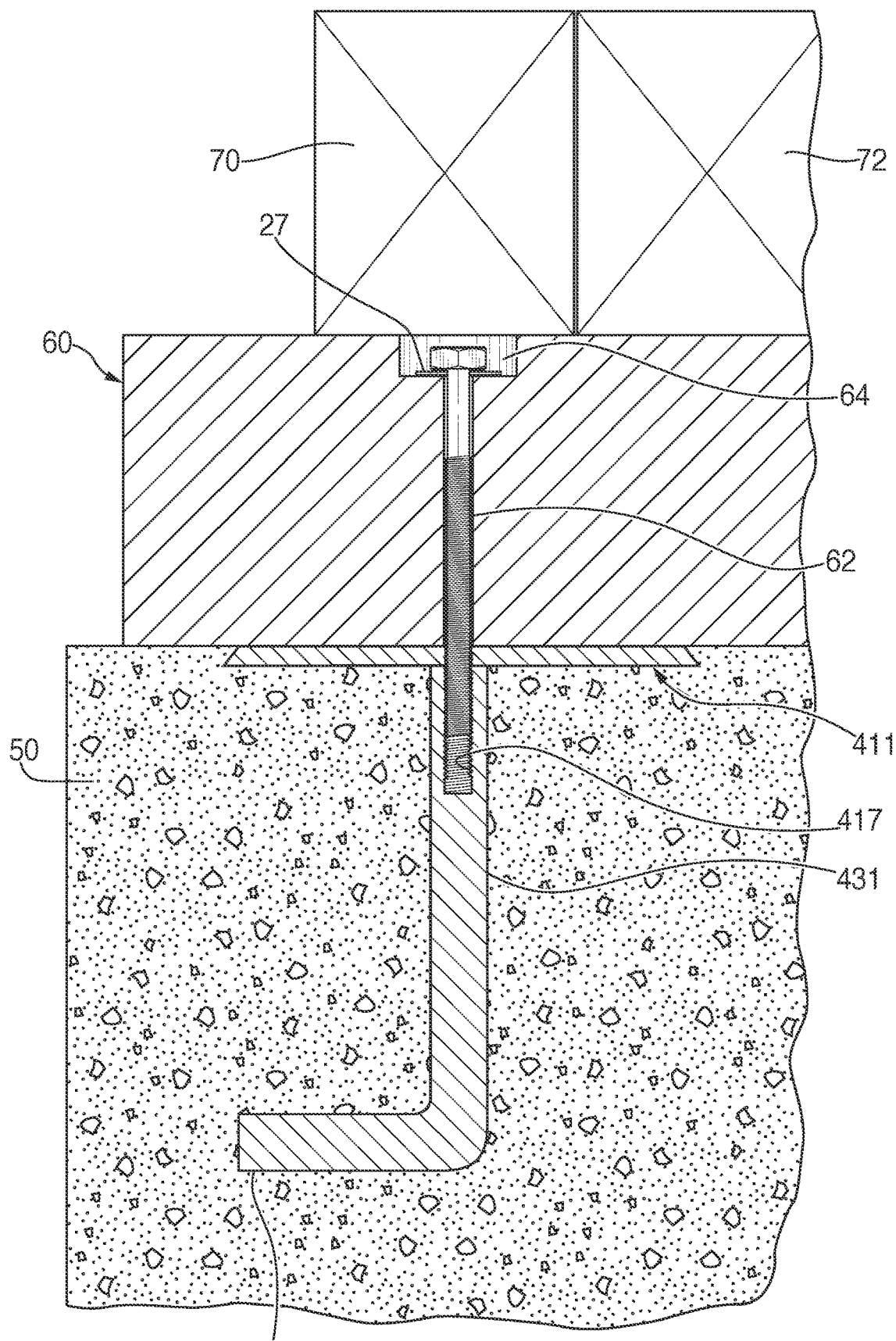
FIG. 11c is a side elevational view, in part section, similar to FIG. 11b, but showing the bolt fully fastened and received through the sill plate and into the blind bore of the flush anchor.

Turning now to FIGS. 11a-11c, therein illustrated is a concrete small flush anchor 400 similar to the flush anchor of FIGS. 8a to 8g except that instead of a threaded blind bore 117 in a screw-type post 116, a generally J-bolt-like, L-shaped cylindrical post 430 is used which has a central, interior threaded blind bore 417 formed in its vertical top leg 431 which, in effect serves as the cylindrical post. Its bottom leg 432 is disposed at an angle α to serve as an anchor and more securely lock the anchor baseplate 411 and bent post 431 in the cement after it sets. In some embodiments, angle α is about 90 degrees. In some embodiments, bottom leg 432 may be disposed at alternate orientations relative to vertical top leg 431, for example, transverse and/or other angular orientations such as acute or obtuse, co-axial and/or may be offset or staggered. As shown in FIGS. 11b and 11c, the flush anchor 400 can be used in a similar manner as the anchor baseplate assembly 10''' in FIGS. 10a-10c to affix a sill plate 60 atop baseplate 11 using a threaded lag bolt 26' and washer 27. Here too, threaded lag bolt 26' is inserted and passed through a throughbore 62 in the sill plate 60 and is threadably inserted in the blind bore 417 of the vertical arm 431 of the L-shaped post 430 after the cement 50 is fully set, and a double-wall sidewall 70, 72 is then mounted on the sill plate 60.

Figure 12A:
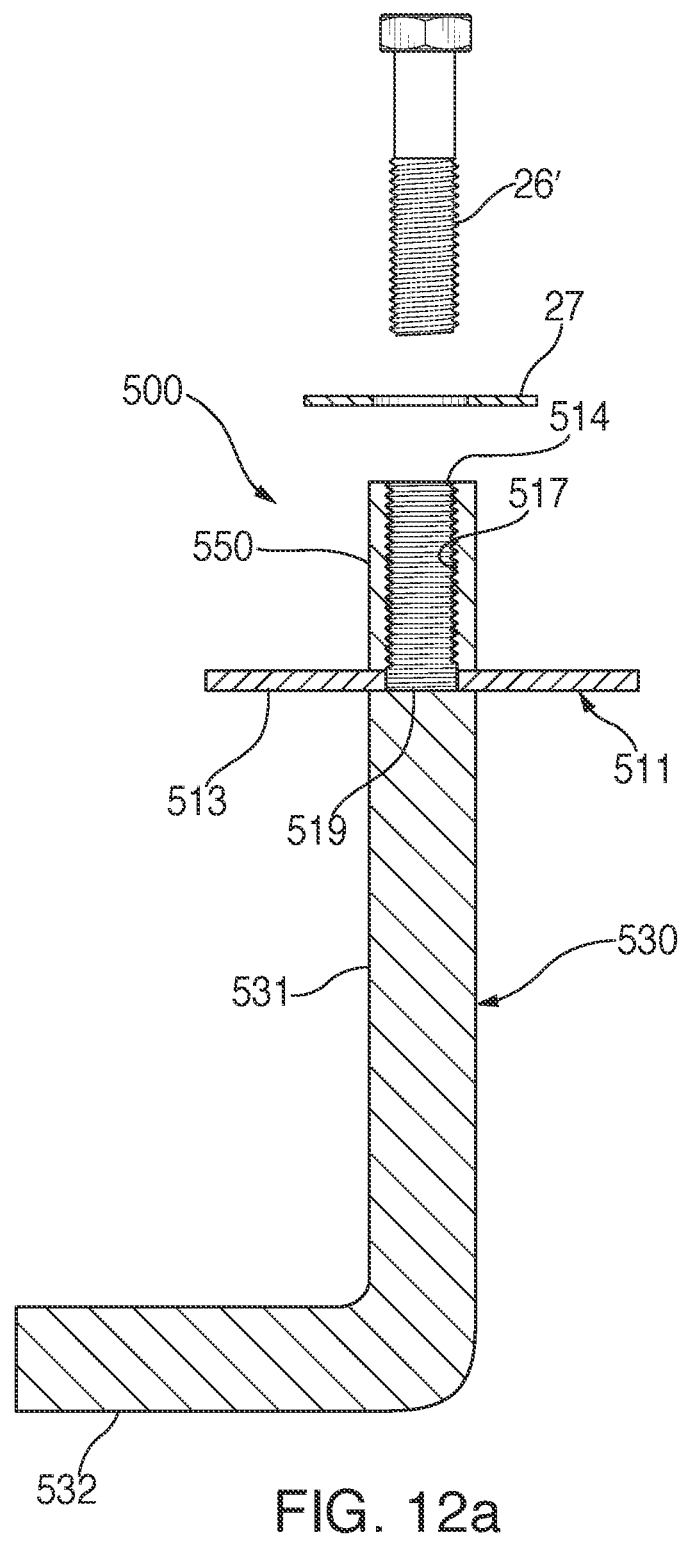
FIG. 12a is a side elevational view, in part section, of a further embodiment of the long neck anchor baseplate assembly shown in FIGS. 8k-8m, having J-bolt-like anchor especially intended for use in poured concrete structures.
Figure 12B:
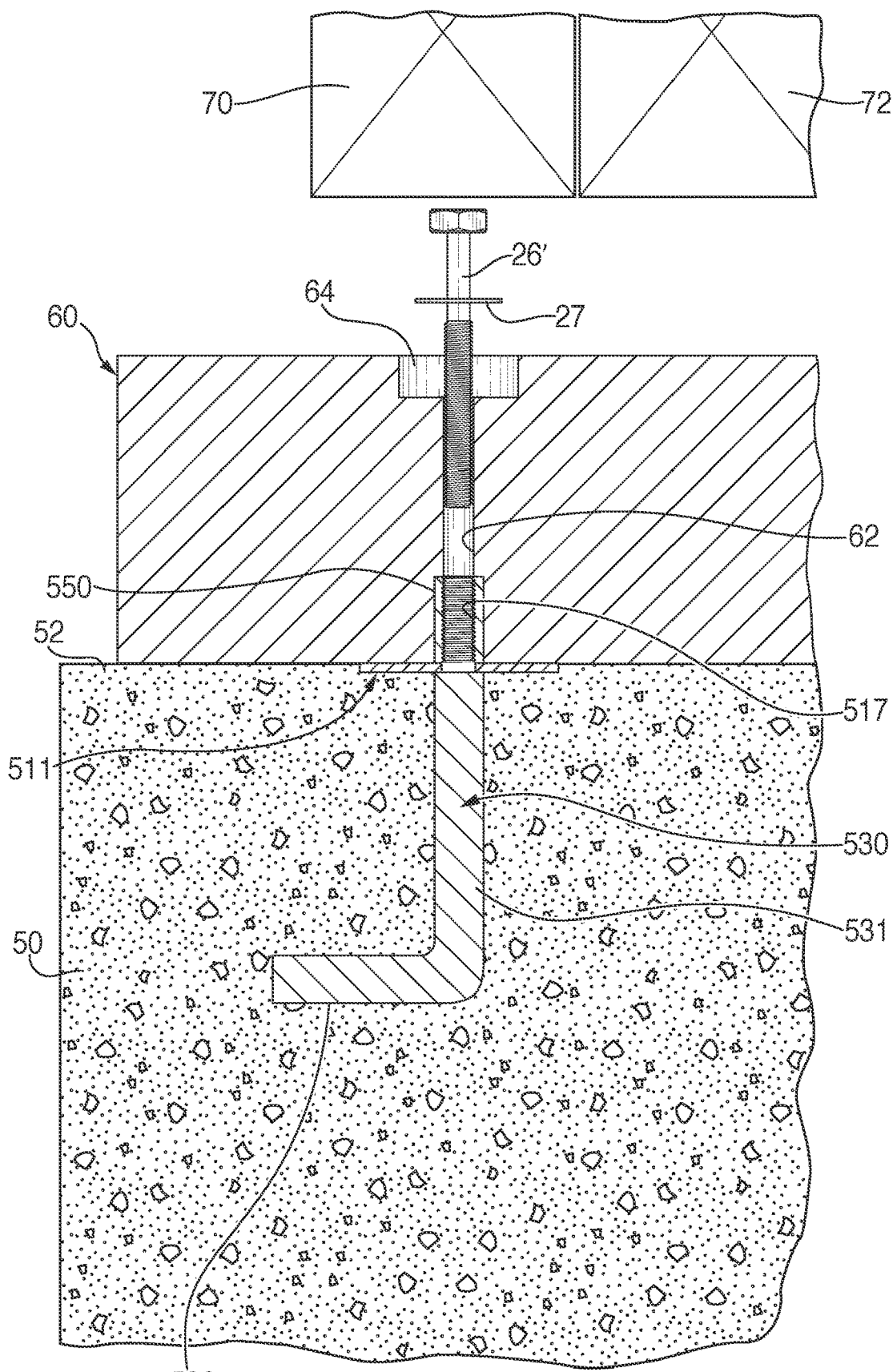
FIG. 12b is a partially exploded, side elevational view, in part section, of the long neck anchor shown in FIG. 12a, embedded in a poured cement footing and showing the positioning of a sill plate side wall, and its associated bolt thereabove and its J-shaped anchor therebelow set in the concrete footing prior to fastening.
Figure 12C:
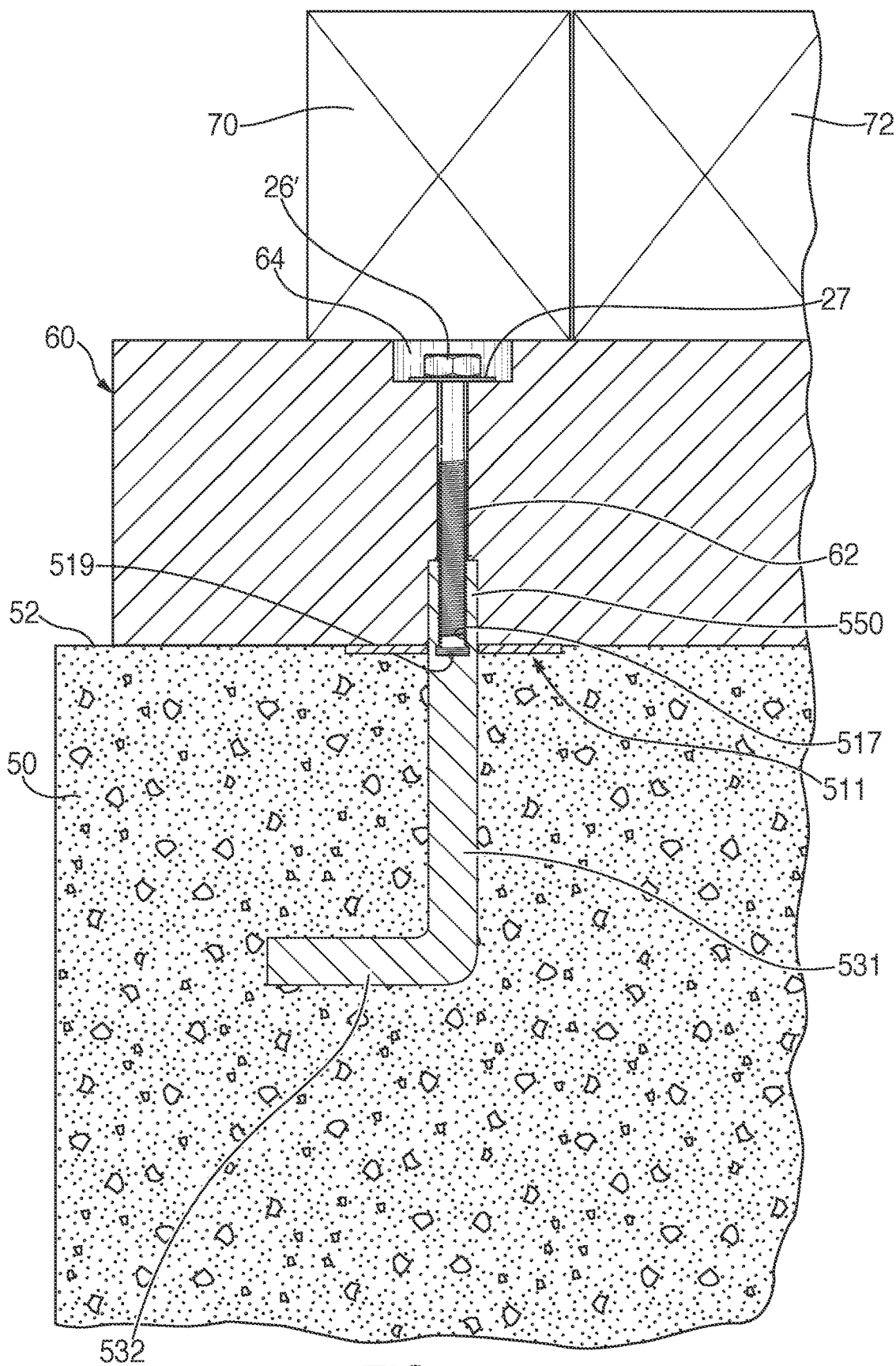
FIG. 12c is a side elevational view, in part section, similar to FIG. 12b, but showing the bolt fastened and fully received through the sill plate and into the blind bore of the anchor and its J-shaped anchor therebelow set in the concrete footing.

FIGS. 12a, 12b and 12c, illustrate the concrete embodiment of the long neck anchor assembly 500 except that instead of either post 316 or 316', it too has a L-shaped, or J-bolt-like bent cylindrical post 530 which has a central, internally threaded blind bore 517 formed in the upper long neck portion 550 of its vertical top leg 531 which opens onto the top free end 514 of long neck 550 and has a bottom closed end 519 flush with the bottom surface 513 of anchor baseplate or flange 11. Its bottom leg 532 is disposed at an angle to its vertical leg 531 (preferably 90° thereto) to more securely lock the anchor baseplate 511 and bent post 530 in the cement after it sets. As seen in FIGS. 12b and 12c, the long neck anchor 500 can be used in a similar manner as the flush anchor 400 to affix a sill plate 60 atop concrete foundation 50 using a threaded lag bolt 26' and washer 27 wherein the head of threaded bolt 26' is received in recess 64 of sill plate 60 and also passes through a throughbore 62 in the sill plate 60 and is threadably inserted in the blind bore 517 of the long neck portion 550 of the vertical arm 531 of the L-shaped post 530 after the cement is fully set.

In this embodiment, the long neck extension 550 extends upwardly beyond the top surface of the cement footing 50, as shown in FIG. 12c, and projects upwardly at least partially through an enlarged section of throughbore 62 of sill plate 60. Threaded bolt 26' and washer 27 would be received in a recess 64 of sill plate 60 and its threaded stem would be threadably inserted in the blind bore 517 of the long neck 550 to lock the sill plate in place. Once again, an accessory such as a doubled walled side wall 70, 72 can then be mounted and fastened flush atop sill plate 60.

Figure 13A:
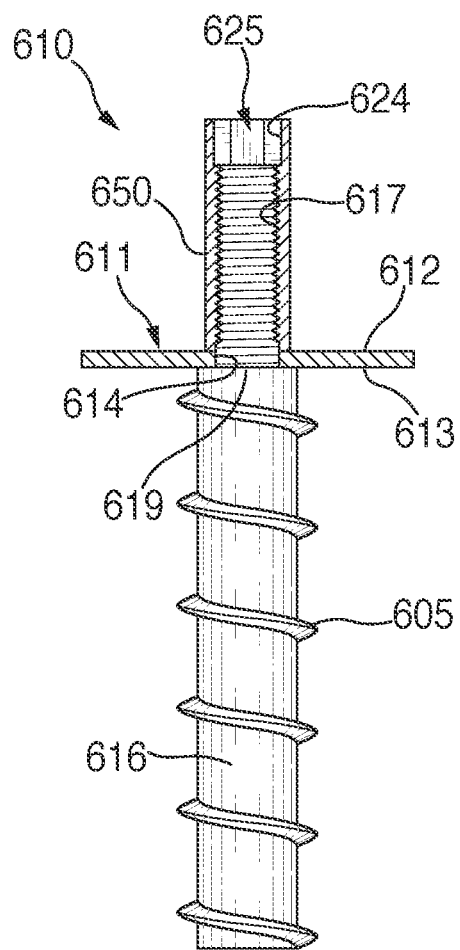
FIG. 13a is a side elevational view, in part section of a long neck anchor assembly having a modified thread for use in concrete.
Figure 13B:
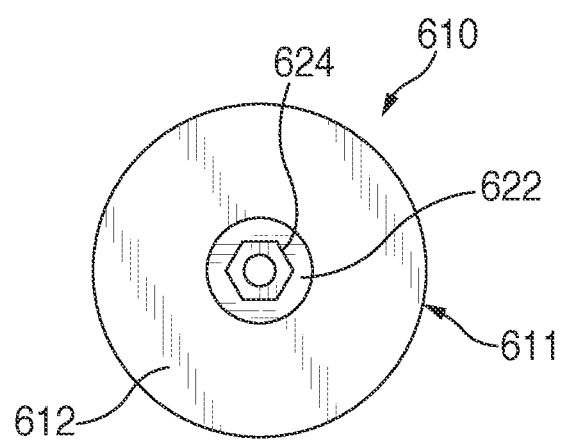

Turning now to FIGS. 13a and 13b, therein illustrated is another variation of a long neck anchor assembly, generally designated by reference numeral 610, having a modified thread 605 for use in concrete. The anchor 610 includes a preferably radially-extending, disk-like, annular baseplate, flange or washer 611 having an upper planar surface 612 and an opposite lower planar surface 613, the latter of which is also preferably welded to the top end of screw anchor post 616. The so-called "extended" or "long neck" 650 comprises an elongated, hollow tube or collar which is attached at its bottom end, preferably via welding, to the upper surface 612 of flange 611. Here too, it could also be integrally formed with post 616 provided the bore 614 had a diameter large enough to allow long neck section 650 to pass therethrough prior to welding.

The neck 650 is preferably substantially cylindrical, but is not limited to any particular geometrical shape as discussed further below. Long neck 650 has a threaded central bore 617 disposed below and adjacent to its open top end 624 which is preferably hexagonal to define an Allen key pork 625. Central bore 617 terminates at the bottom wall 613 of baseplate 611 and does not extend into screw anchor 616. As in the other embodiments, an Allen key tool (not shown) can be inserted into the Allen key port 625 to facilitate and effect its threaded engagement into and from a support structure.

The thread 605 is configured for engaging concrete. In some embodiments, thread 605 includes coarse threads or notched threads, and a diamond-shaped, nail type point. For applications where the cement is already set or cured, a bore would be provided in the concrete and a conventional lead shield would be inserted and mounted therein. The threaded post would then be mounted in the lead shield and held thereby.

Figure 13C:
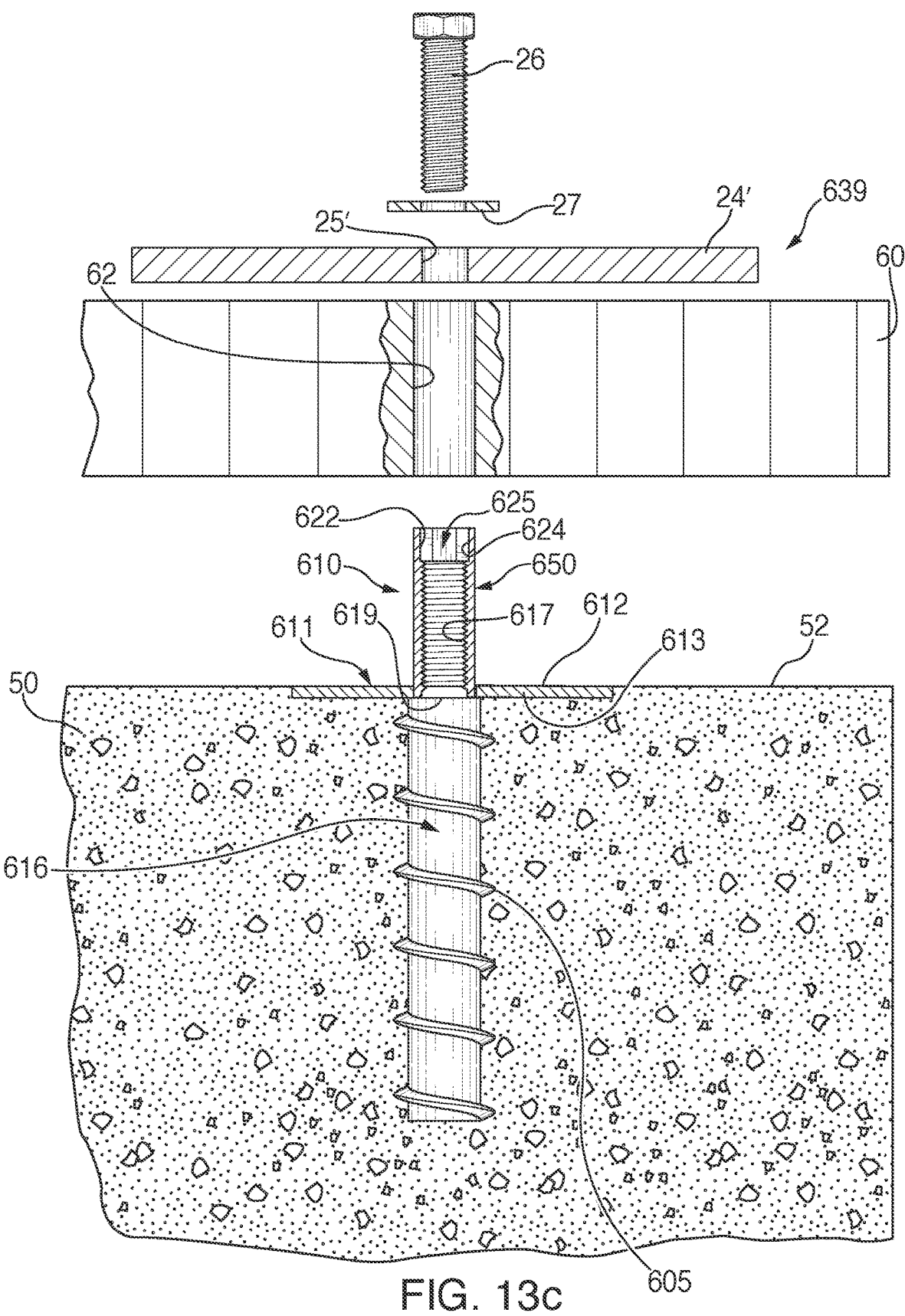
FIG. 13c is an exploded, side elevational view, in part section of the inventive long neck anchor assembly shown in FIGS. 13a and 13b but set in a concrete foundation and with a sill plate and an object disposed thereabove for securement thereto.
Figure 13D:
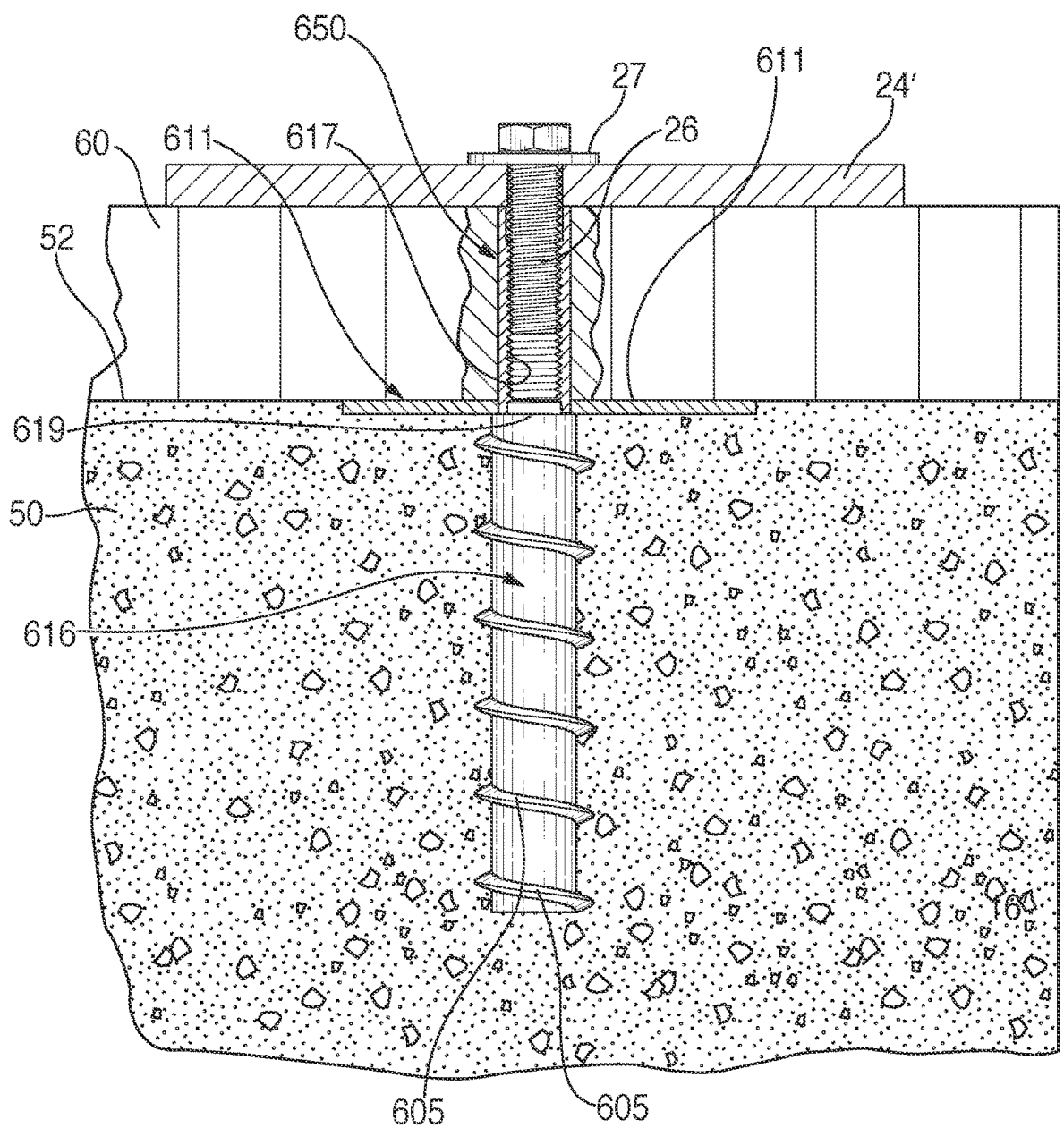
FIG. 13d is a side elevational view, in part section, of the inventive long neck anchor assembly shown in FIG. 13c, embedded in a poured concrete foundation and showing the mounting of a sill plate thereon and a sidewall and associated bolt thereabove.

FIG. 13c is an exploded, side elevational view, in part section of the inventive long neck anchor assembly shown in FIGS. 13a and 13b mounted in concrete and with the intended framing disposed thereabove. FIG. 13d is a side elevational view, in part section of the inventive long neck anchor assembly in an installed position relative to the framing or wall structure to which it is attached, also showing the sheathing through which, it extends and further showing it fastening an accessory in a flush manner against the sheathing.

More particularly, as seen in FIG. 13c after the concrete foundation or structure 50 is poured, the anchor assembly 610 is placed in the still uncured cement 50 such that its threaded shaft 616 extends fully in cement 50 perpendicular to its top surface 52, aided by its anchor baseplate which is positioned to assume an upright position with its top surface 612 lying flush with the top surface 52 of concrete base or structure 50.

Once the cement 50 fully cures and sets, the anchor baseplate assembly 610 is ready for fastening to an accessory, in this illustrated example, a sill plate 60 having a vertically-extending throughbore 62 through which the long neck 650 may pass. A bolt 26 with a washer 27 is then inserted into a throughbore 25' of an object or accessory structure 24' extending through the sill plate 65 so that the bolt 26 can be threadably received in the throughbore 617 and then tightened to securely affix the sill plate 60 and object 24' to the anchor baseplate 611 and, in turn, the cement foundation 50. Here too, anchor assembly 610 could be used for concrete that is already cured or set typically with the use of lead shields mounted in pre-drilled holes in the concrete.

Figure 14A:
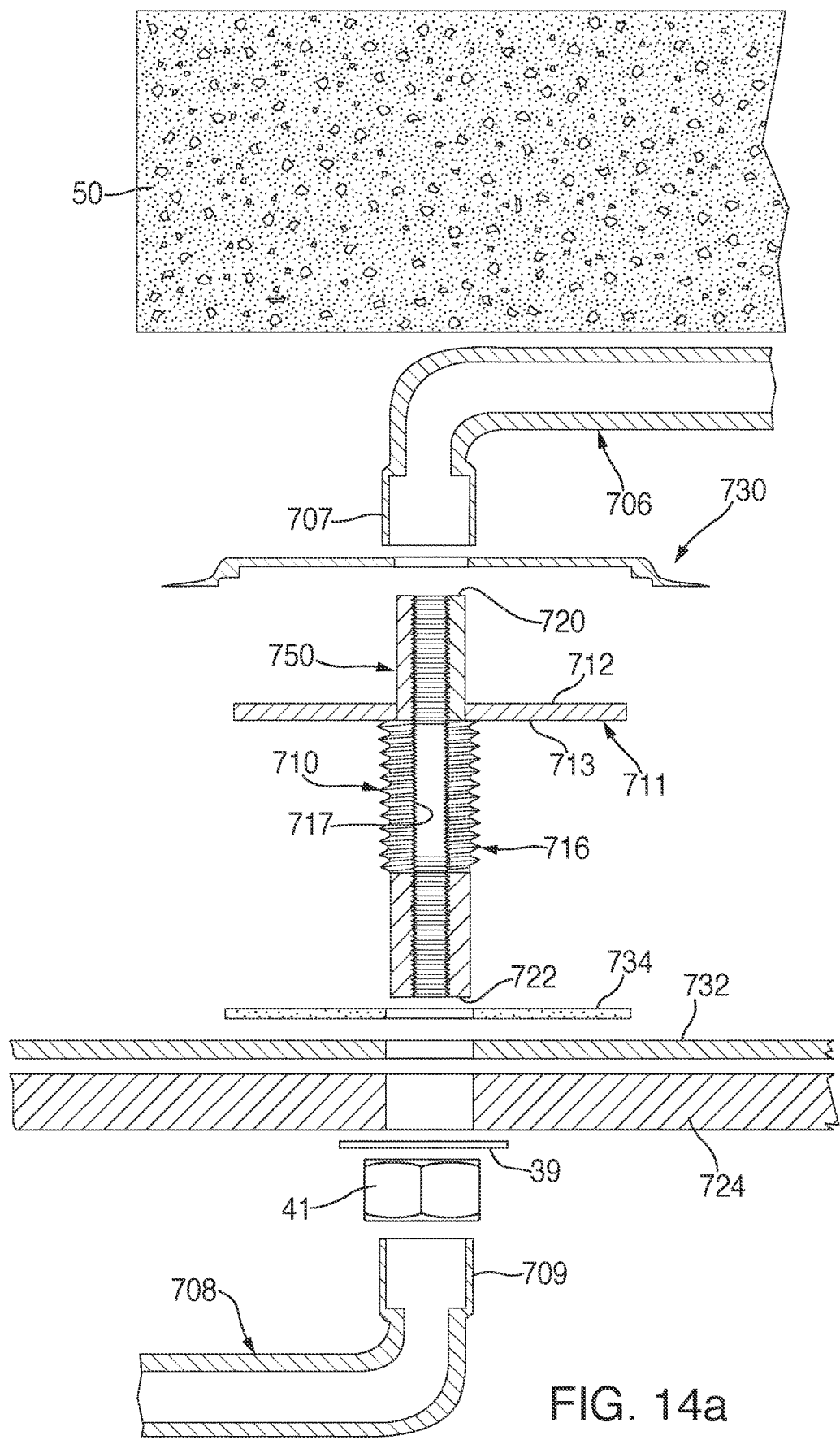
FIG. 14a is an exploded, side elevational view, in part section, of a further embodiment of the flush anchor assembly intended for a radiant floor heating system embedded in a concrete floor substrate above a wood subfloor.
Figure 14B:
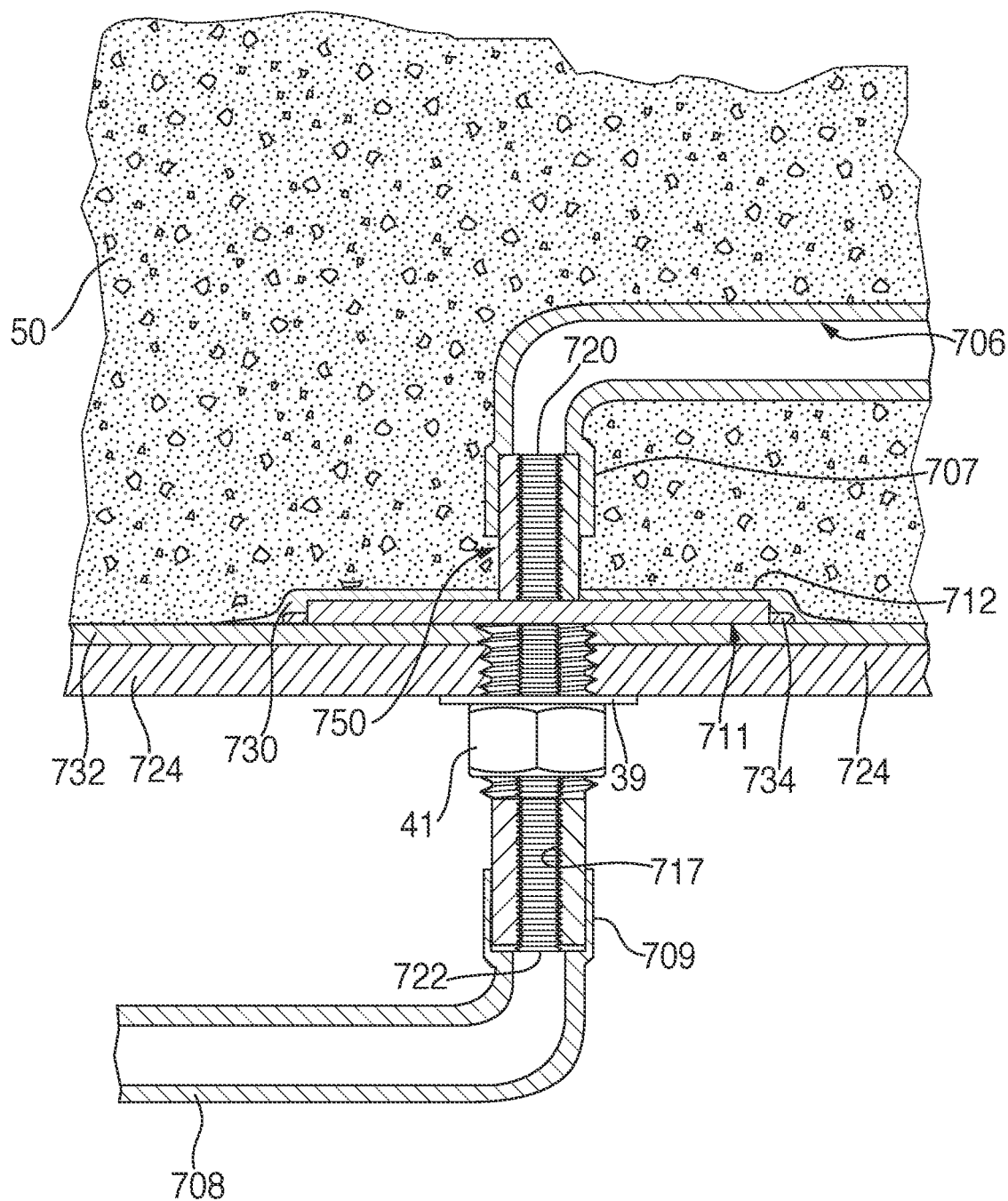
FIG. 14b is a side elevational view, in part section, of the anchor assembly shown in FIG. 14a shown in a fully mounted state.

FIGS. 14a and 14b disclose a further embodiment of the anchor baseplate assembly 710 configured for use with a fluid source via hoses 706, 708 to allow fluid F to flow through anchor baseplate assembly 710, as described herein. The anchor baseplate assembly 710 includes an anchor baseplate 711 having a top surface 712 and a bottom surface 713. A cylindrical post 716 is provided with an internally threaded or non-threaded throughbore 717 that is open at both the top end 720 and a bottom end 722 of post 716. Post 716 includes an upper long neck portion 750 disposed above baseplate 711 and a preferably partially threaded lower portion 716 disposed below baseplate 711. In some embodiments, throughbore 717 may include a threaded surface. In some embodiments, throughbore 717 includes a smooth surface. In some embodiments, post 716 includes a threaded surface. In some embodiments, post 716 includes a smooth surface.

Ends 720 and 722 are configured for connection with hoses 706, 707, respectively. Hoses 706, 707 can be coupled to the end 720, 722, by various means, such as for example, a clamping, threaded, snap-fit, and/or friction fit. As shown, the ends, 707, 709 of hoses 706, 708 respectively are configured and dimensioned to permit the same to be mounted on the smooth ends 720, 722 of long neck portion 750 and lower portion of post 716, respectively by a friction fit. Ribs (not shown) could be provided on either ends of the hoses or post to enhance gripping. In some embodiments, a membrane and/or flange 730 is configured for disposition between surface 712 of anchor baseplate 711 and hose 706. Membrane 730 is configured to provide a seal to resist and/or prevent leaking of fluid from hose 705. In some embodiments, a membrane and/or flange 732 and/or caulk 734 is configured for disposition between surface 713 of anchor baseplate 711 and support structure 724. Membrane 732 is configured to provide a seal to resist and/or prevent leaking of fluid from hose 706.

In some embodiments, anchoring hoses 706, 708 and post 716 allows fluid, for example, water to pass through while providing a solid and strong joint with the lower surface 713 of baseplate 711 lying flush against the supporting structure 724. In some embodiments, this configuration can be utilized with radiant heating systems which are covered in poured cement 50 as shown in FIG. 14b or equivalent synthetic mortar and connected at an opposite end with a wood or floor base 724 to lead to a heated water source. The anchor baseplate 711 is affixed to the floor 724 via its post 716 and a washer 39 and threaded nut 41 received on the threaded upper section of post 716. Alternatively, the other anchors disclosed herein could also be modified to allow the flow of water therethrough in a comparable manner via an internal throughbore, whether smooth or threaded and whether it be a straight post or an "L" or "J" shaped post, as long as it extends through the post with openings at both ends for connecting the same to water or fluid hoses, pipes or the like. As can also be appreciated, the anchor assemblies as shown herein can also be mounted upside down, sideways or any other desired orientation relative to the concrete and/or support structures which can likewise assume various orientations and shapes based on the needs of a particular application.

As mentioned above, the materials of the anchors, their dimensions, threading configuration and size depend on the application and the surrounding building material (e.g., wood, concrete, steel, aluminum, etc.). In concrete, the anchor can be inserted into wet cement so it is locked in place when the cement sets. Alternatively, a hole may be pre-drilled into the concrete before the anchors are screwed therein. In such a case, a lead shield (not shown) is optionally placed in the concrete hole and the anchor is screwed into the opening grasping the lead shield or the anchor could be threaded directly into a slightly small pilot hole in the concrete.

Similarly, it is anticipated that the types of fasteners, membrane flashing materials, and sealants will also be chosen to be compatible with the supporting surfaces. Also, the elements of the various embodiments may be substituted for one another where appropriate. It may also be possible to utilize the anchoring and fastening assemblies for other building construction tasks where solid anchoring, a water-resistant seal are of particular importance.

It is to be understood that the above-mentioned figures are only illustrative of the application of the principles of the present disclosure. Numerous modifications or alternative arrangements may be devised by those skilled in the art without departing from the spirit and scope of the present disclosure. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

While the foregoing specifically describes and illustrates the use of the anchor baseplate and screw anchor assemblies shown in use with, glass rails, lightning rods, grounding cables and L-shaped brackets for solar panels, they can also be used for anchoring and supporting a wide variety of other objects to support structures, such as roof or other building accessories, e.g., antennas, TV satellite dishes, HVAC units and the like.

As briefly touched upon in the discussion of FIG. 4a, it is important to use cylindrical mechanical fasteners having a "straight" thread for mounting an object on a support structure via the internally-threaded cylindrical blind bore of the various embodiments described herein. More specifically, mechanical fasteners of this type have a so-called "straight" thread—namely bolts with heads and cylindrical threaded shafts and cylindrical rod-shaped studs which are headless. This is to be distinguished from a "cone-shaped" screw which has a so-called "tapered" thread. The use of such a cylindrical bolt or stud fastener with a straight thread ensures a strong joint and the versatility of accommodating fasteners of varying lengths and widths for achieving various degrees of holding power via threaded receipt in the internally-threaded, cylindrical blind bores of the posts which also have a straight edge. In contrast, the mechanical fasteners used to affix the anchor baseplate to a support via ancillary holes 15 may generally be of any type including screws with a "tapered" thread.

As can also be appreciated from the foregoing, the shape and the number of anchor baseplates, the shape, type and number of posts, whether externally-threaded or smooth, the use of non-threaded throughbores, threaded blind bores, and the placement thereof can also be modified depending upon the specific details of the particular application such as the nature, size and material of the roof or other building support structures, such as metal, wood or some other composite. For example, a preferred range of the length or height of the posts may be anywhere from 0 inches (flush) to 18 inches. Similarly, it is anticipated that the types of fasteners, membranes flashing materials and sealants will also be chosen to be compatible with the roof or building structure. Also, the elements of the various embodiments may be substituted for one another where appropriate.

In addition, although the anchors aside from the raised hexagon hex screw anchor, preferably employ a flat head screw slot or an Allen key port to secure or remove the anchor to a support structure, other means, such as a star bit etc., could instead be used to assist the user in screwing in and/or removing the anchor to, or from, a building support.

It should also be noted that the dimensions of the various parts and elements can be varied as needed or preferred. For example, the upper and lower posts of cylindrical dual posts typically have diameters and are preferably in a range of ⅛" to 2". For example, one post could have a width of ½" while the other post could have a width of ¾", or they could have the same width. Of course, the diameter of the upper and lower sections can be larger or smaller relative to one another, as desired. The nut is preferably between ½" and 3", but a typical standard size may be ¾". The thickness of the baseplate may be varied according to need, for example, preferably between 1/16" to 1", but preferably ¼". Bolts with attached nuts, or bolts with separate nuts are usable and may be used interchangeably herein. In a preferred embodiment, the post has an external diameter of ½" and its internal bore has a diameter of ⅜". The screw anchor may have a width or thickness of about 1/16" and a diameter of about 1½". However, as mentioned above, the dimensions of the baseplate flange and bores can vary as well as the length of the posts and their internal bores.

The materials of the components of the anchor assemblies, such as the baseplates and posts can also be made of a variety of materials, including, e.g., metals such as stainless steel, aluminum, bronze, copper, plastic or composite materials. It is also preferred that the baseplate and its post and the screw anchors and their flanges are integrally formed as a one-piece component. However, it can be appreciated that the posts can be secured to the baseplate via welding or other means.

Similarly, it is anticipated that the types of fasteners, membrane flashing materials, and sealants will also be chosen to be compatible with the supporting surfaces. Also, the elements of the various embodiments may be substituted for one another where appropriate. It may also be possible to utilize the anchoring and mounting assemblies for other building construction tasks where solid anchoring, a water-resistant seal, and/or precise and facile installation are of particular importance such as for a wide variety of other plumbing applications, aside from poured concrete or heated floors, such as for both indoor and/or outdoor applications such as garden spouts and hoses, sinks, showers and other water supply systems.

Accordingly, while particular embodiments of the invention have been described, it is not intended that the invention be limited thereto, as it is intended that the invention be as broad in scope as the prior art will allow and that the specification be read likewise. It will therefore be appreciated by those skilled in the art that other modifications could be made thereto without departing from the spirit and scope of the invention.

What is claimed is:

1. A combined anchor and fastening assembly for anchoring an object having a planar bottom surface and throughbore to a concrete structure, comprising:
   a substantially solid, planar anchor baseplate having parallel top and bottom surfaces and a throughbore extending from said top surface to said bottom surface thereof, said top surface defining a top side of said anchor baseplate and said bottom surface defining a bottom side of said anchor baseplate;
   an elongated post permanently affixed to said anchor baseplate to define an integrally-formed, one-piece combined anchor and post assembly composed solely of said anchor baseplate and said post with said anchor baseplate having a width greater than said post, said post comprising a shank having an upper shank portion and a lower shank portion, said upper shank portion having an upper end and a lower end, with said upper shank portion being co-axially aligned with said throughbore of said anchor baseplate, said upper shank portion extending below said bottom wall of said anchor baseplate and being disposed generally perpendicular thereto, and wherein said lower shank portion is joined to said lower end of said upper shank portion and is disposed and projects generally transversely thereto whereby said lower shank portion serves to embed and anchor said one-piece combined anchor baseplate and post assembly in the concrete structure;
   said top surface of said anchor baseplate being configured and dimensioned to allow the object to be positioned on said top side of said anchor baseplate such that the planar bottom surface of the object abuts and lies generally flush against said top surface of said anchor baseplate, and wherein said planar top surface of said anchor baseplate is configured and dimensioned to lie generally flush with the top surface of the concrete structure and with said bottom surface of said anchor baseplate being embedded in the concrete structure therebelow;
   means for anchoring the object to said one-piece combined anchor baseplate and post assembly, said means comprising an at least partially-threaded, cylindrical internal blind bore formed in said upper end of said upper shank portion having an open top end and a closed bottom end with said open top end thereof being aligned with and opening onto said top side of said anchor baseplate; and
   a mechanical fastener in the form of a threaded bolt having an at least partially-threaded shank receivable through the throughbore of the object and threadedly receivable in said post at least partially-threaded, cylindrical internal blind bore for anchoring the object to the top side and top surface of said anchor baseplate.

2. The combined anchor and fastening assembly according to claim 1, wherein said post blind bore in said upper shank portion extends below said bottom wall of said anchor baseplate towards said lower end thereof.

3. The combined anchor and fastening assembly according to claim 1, wherein said post has a generally L-shaped profile and serves as said means for anchoring said one-piece combined anchor baseplate and post assembly in the concrete structure.

4. The combined anchor and fastening assembly according to claim 1, wherein said lower shank portion is disposed at an angle to said upper shank portion.

5. The combined anchor and fastening assembly according to claim 4, wherein said angle is 90° so that said post has a generally L-shaped profile.

6. The combined anchor and fastening assembly according to claim 4, wherein said anchor baseplate bore is cylindrical and internally threaded and merges with and defines said open top end of said at least partially-threaded post cylindrical internal blind bore.

7. The combined anchor and fastening assembly according to claim 1, further comprising a washer mounted on said bolt having a diameter greater than said post blind bore.

8. The combined anchor and fastening assembly according to claim 7, wherein said threaded bolt has a straight edge.

9. The combined anchor and fastening assembly according to claim 1, wherein said anchor baseplate comprises a flange.

10. The combined anchor and fastening assembly according to claim 9, wherein said flange is a generally circular, planar flange.

11. The combined anchor and fastening assembly according to claim 1, wherein said upper end of said upper shank portion of said post comprises an elongated tubular neck portion in which said at least partially-threaded cylindrical internal blind bore is formed with an open top end and a closed bottom end, and wherein said bottom closed end thereof is affixed adjacent to said top surface of said anchor baseplate with said internal blind bore of said elongated tubular neck portion being in axial alignment and registry with said throughbore of said baseplate.

12. The combined anchor and fastening assembly according to claim 1, wherein said threaded bolt is a threaded lag bolt having a shank with a non-externally threaded smooth upper portion.

13. The combined anchor and fastening assembly according to claim 1, wherein said anchor baseplate and said post are both made of metal.

14. The combined anchor and fastening assembly according to claim 1, wherein said anchor baseplate and said post are made of the same material.

15. The combined anchor and fastening assembly according to claim 14, wherein said anchor baseplate and said post are made of the same material selected from the group consisting of metal, plastic, wood and a composite material.

16. A method of anchoring an object having a planar bottom surface and a throughbore to a concrete structure utilizing a combined anchor and fastening assembly comprising a substantially solid, planar anchor baseplate having parallel top and bottom surfaces and a throughbore extending from said top surface to said bottom surface thereof, said top surface defining a top side of said anchor baseplate and said bottom surface defining a bottom side of said anchor baseplate;

an elongated post permanently affixed to said anchor baseplate to define an integrally-formed, one-piece combined anchor and post assembly composed solely of said anchor baseplate and said post with said anchor baseplate having a width greater than said post, said post comprising a shank having an upper shank portion and a lower shank portion, said upper shank portion having an upper end and a lower end, with said upper shank portion being co-axially aligned with said throughbore of said anchor baseplate, said upper shank portion extending below said bottom wall of said anchor baseplate and being disposed generally perpendicular thereto, and wherein said lower shank portion is joined to said lower end of said upper shank portion and disposed and projects generally transversely thereto whereby said lower shank portion serves to embed and anchor said one-piece combined anchor baseplate and post assembly in the concrete structure;

said top surface of said anchor baseplate being configured and dimensioned to allow the object to be positioned on said top side of said anchor baseplate such that the planar bottom surface of the object abuts and lies generally flush against said planar top surface of said anchor baseplate, and wherein said planar top surface of said anchor baseplate is configured and dimensioned to lie generally flush with the top surface of the concrete structure and with said bottom surface of said anchor baseplate being embedded in the concrete structure therebelow;

means for anchoring the object to said one-piece combined anchor baseplate and post assembly, said means comprising an at least partially-threaded, cylindrical internal blind bore formed in said upper end of said upper shank portion having an open top end and a closed bottom end with said open top end thereof being aligned with and opening onto said top side of said anchor baseplate; and a mechanical fastener in the form of a threaded bolt having an at least partially-threaded shank receivable through the throughbore of the object and threadably receivable in said post at least partially threaded cylindrical internal blind bore for anchoring the object to the top side and top surface of said anchor baseplate, comprising the steps of:

(a) placing said one-piece anchor and fastening assembly in the concrete structure before it sets such that said top surface of said anchor baseplate lies generally flush with said top surface of said concrete structure and with said bottom surface of said anchor baseplate being embedded in the concrete structure therebelow and with at least a portion of said post extending into and below the top surface of said concrete structure so said post is embedded therein; and (b) allowing said concrete of said concrete structure to set and cure to form a cured concrete structure to thereby anchor said one-piece anchor baseplate and post assembly in said concrete structure via said at least partially embedded anchor and post.

17. The method of claim 16, wherein said step (a) is performed with a post having a generally L-shaped configuration.

18. The method of claim 16, further comprising the step of:

(c) after said concrete structure has set and cured, mounting an object having a planar bottom surface and a throughbore atop said top surface of said anchor baseplate so that said planar bottom surface of said object lies generally flush with said top surface of said anchor baseplate with said throughbore of said object being coaxially aligned with said anchor baseplate throughbore.

19. The method according to claim 18, further comprising the step of:

(d) inserting the at least partially-threaded shank of the threaded bolt into and through said object throughbore and threadably receiving said at least partially threaded bolt shank in said threaded blind bore of said post to thereby anchor said object to said post and, in turn, said concrete structure.

20. The method according to claim 19, further comprising the step of:

prior to step (d), placing a washer on said threaded bolt having a diameter greater than said object throughbore to assist in securing said object against said top surface of said anchor baseplate.

21. The method according to claim 19, further comprising the step of:

prior to step (d), providing said threaded bolt with a bolt head having a width greater than said throughbore of said object so that said bolt head can hold the object tightly against said concrete structure.

\* \* \* \* \*